(12) United States Patent
Harada et al.

(10) Patent No.: US 8,341,197 B2
(45) Date of Patent: Dec. 25, 2012

(54) ENCODER, DECODER, THEIR METHODS, PROGRAMS THEREOF, AND RECORDING MEDIA HAVING PROGRAMS RECORDED THEREON

(75) Inventors: Noboru Harada, Musashino (JP); Takehiro Moriya, Musashino (JP); Yutaka Kamamoto, Musashino (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 168 days.

(21) Appl. No.: 12/518,789

(22) PCT Filed: Dec. 28, 2007

(86) PCT No.: PCT/JP2007/075273
§ 371 (c)(1),
(2), (4) Date: Jul. 27, 2009

(87) PCT Pub. No.: WO2008/084738
PCT Pub. Date: Jul. 17, 2008

(65) Prior Publication Data
US 2010/0017373 A1 Jan. 21, 2010

(30) Foreign Application Priority Data
Jan. 9, 2007 (JP) ................................. 2007-001290

(51) Int. Cl.
*G06F 12/00* (2006.01)
*G06F 15/16* (2006.01)
(52) U.S. Cl. ...................................... 707/821; 709/232
(58) Field of Classification Search ................ 707/3, 10, 707/101, 102, 204, 600, 899
See application file for complete search history.

(56) References Cited

U.S. PATENT DOCUMENTS

| 5,754,848 | A | | 5/1998 | Hanes |
| 5,778,359 | A | * | 7/1998 | Stent ............................. 712/300 |
| 5,999,949 | A | * | 12/1999 | Crandall ....................... 715/234 |
| 6,144,969 | A | | 11/2000 | Inokuchi et al. |
| 6,536,035 | B1 | * | 3/2003 | Hawkins ................... 717/999.1 |
| 7,114,048 | B2 | * | 9/2006 | Iwatsu et al. .................. 711/165 |

(Continued)

FOREIGN PATENT DOCUMENTS

JP 2000 276388 10/2000

(Continued)

OTHER PUBLICATIONS

Office Action issued Feb. 1, 2011, in China Patent Application No. 200780046247.5 (with English translation).

(Continued)

*Primary Examiner* — Don Wong
*Assistant Examiner* — Mohammad Kabir
(74) *Attorney, Agent, or Firm* — Oblon, Spivak, McClelland, Maier & Neustadt, L.L.P.

(57) ABSTRACT

In encoding for putting one or more files and/or one or more files in a folder into a single archive file, original hierarchy information and standard hierarchy information generated by converting characters in a special character coding in each file name to characters in a standard character coding are recorded in the archive file. If the character coding used in the original hierarchy information in the archive file cannot be used in the system environment used in decoding, a file name in the standard character coding is generated from the standard hierarchy information and is converted to a character coding that can be used in the system environment.

8 Claims, 21 Drawing Sheets

U.S. PATENT DOCUMENTS

| | | | |
|---|---|---|---|
| 2002/0044219 A1* | 4/2002 | Mitts et al. | 348/465 |
| 2002/0147735 A1* | 10/2002 | Nir | 707/999.2 |
| 2006/0259499 A1 | 11/2006 | Moulckers et al. | |
| 2007/0005795 A1* | 1/2007 | Gonzalez | 709/232 |
| 2010/0191780 A1* | 7/2010 | Kroll | 707/822 |

FOREIGN PATENT DOCUMENTS

| | | |
|---|---|---|
| JP | 2004 310371 | 11/2004 |
| WO | WO 2005/048132 A1 | 5/2005 |

OTHER PUBLICATIONS

Office Action issued Mar. 23, 2012, in Chinese Patent Application No. 200780046247.5 (with English-language translation).

Japanese Office Action dated Sep. 16, 2011, corresponding to Japanese Patent Application No. 2008-553081, with English translation.

* cited by examiner

FIG.6-1

```xml
<?xml version="1.0" encoding="UTF-8"?>
<DIDL xmlns="urn:mpeg:mpeg21:2002:02-DIDL-NS"
xmlns:pamaf="urn:mpeg:mpeg21:2007:01-PAAF-NS"
xmlns:xsi="http://www.w3.org/2001/XMLSchema-instance"
xsi:schemaLocation="urn:mpeg:mpeg21:2002:02-DIDL-NS
  DIDL.xsd urn:mpeg:mpeg21:2007:01-PAAF-NS PAAF.xsd ">
    Contai<ner>
        <!--Root Container-->
        <Container>
            <Descriptor>
                <Statement mimeType="text/xml">
                    <pamaf:FileSystemAttributes>
                        <pamaf:Name>folder1//</pamaf:Name>
                        <pamaf:ParentPath ref="C://"/>
                    </pamaf:FileSystemAttributes>
                </Statement>
            </Descriptor>
            <Item>
                <Descriptor>
                    <Statement mimeType="text/xml">
                        <pamaf:FileSystemAttributes>
                            <pamaf:Name>file1.txt</pamaf:Name>
                            <pamaf:OriginalSize>1024</pamaf:OriginalSize>
                            <pamaf:OtherRestrictions>
                                <pamaf:NoWrite/>
                                <pamaf:NoExecute/>
                            </pamaf:OtherRestrictions>
                        </pamaf:FileSystemAttributes>
                    </Statement>
                </Descriptor>
            </Item>
```

FIG.6-2

```
<Container>
    <Descriptor>
        <Statement mimeType="text/xml">
            <pamaf:FileSystemAttributes>
                <pamaf:Name>folder2//</pamaf:Name>
            </pamaf:FileSystemAttributes>
        </Statement>
    </Descriptor>
    <Item>
        <Descriptor>
            <Statement mimeType="text/xml">
                <pamaf:FileSystemAttributes>
                    <pamaf:Name>file2*JPN1*EUC.wav</pamaf:Name>
                    <pamaf:Name charset=EUC_JP encoding=base64>
                        pdWlqaXrpcAxL6XVpaGlpKXrMS52YXY=
                    </pamaf:Name>
                    <pamaf:OriginalSize>1024</pamaf:OriginalSize>
                    <pamaf:OtherRestrictions>
                        <pamaf:NoWrite/>
                        <pamaf:NoExecute/>
                    </pamaf:OtherRestrictions>
                </pamaf:FileSystemAttributes>
            </Statement>
        </Descriptor>
    </Item>
```

FIG.6-3

```xml
            <Item>
                <Descriptor>
                    <Statement mimeType="text/xml">
                        <pamaf:FileSystemAttributes>
                            <pamaf:Name>
                                file2*JPN1*UTF-8.wav
                            </pamaf:Name>
                            <pamaf:OriginalSize>1024</pamaf:OriginalSize>
                        </pamaf:FileSystemAttributes>
                    </Statement>
                </Descriptor>
            </Item>
            <Item>
                <Descriptor>
                    <Statement mimeType="text/xml">
                        <pamaf:FileSystemAttributes>
                            <pamaf:Name>file4*JPN1*SJIS.mp4</pamaf:Name>
                            <pamaf:Name charset=Shift_JIS encoding=base64>
                                pdWlqaXrpcAxL6XVpaGlpKXrMS52YXY=
                            </pamaf:Name>
                            <pamaf:OriginalSize>1024</pamaf:OriginalSize>
                            <pamaf:OtherRestrictions>
                                <pamaf:NoWrite/>
                                <pamaf:NoExecute/>
                            </pamaf:OtherRestrictions>
                        </pamaf:FileSystemAttributes>
                    </Statement>
                </Descriptor>
            </Item>
        </Container>
      </Container>
   </Container>
</DIDL>
```

FIG.11A

| Windows / NTFS |
|---|
| READ-ONLY |
| HIDDEN FILE |
| CREATION DATE AND TIME |
| UPDATE DATE AND TIME |
| ACCESS DATE AND TIME |

FIG.11B

| Mac / UFS Linux / UFS |
|---|
| ownerREAD |
| ownerWRITE |
| ownerEXECUTE |
| groupREAD |
| groupWRITE |
| groupEXECUTE |
| othersREAD |
| othersWRITE |
| othersEXECUTE |
| CREATION DATE AND TIME |
| UPDATE DATE AND TIME |

FIG.11C

| STANDARD FORMAT |
|---|
| ownerREAD |
| ownerWRITE |
| ownerEXECUTE |
| UPDATE DATE AND TIME |

FIG.18

ARCHIVE FILE INFORMATION
(FILE NAMES, FOLDER HIERARCHY INFORMATION,
ATTRIBUTE INFORMATION)

```
<ENTRY 1>
ORIGINAL HIERARCHY INFORMATION : "*JPN5* File1.xml"
   CHARACTER CODING : SJIS
STANDARD HIERARCHY INFORMATION : "*JPN5* File1.xml"
   FILE TYPE INFORMATION : PlayList <ENTRY 2>
ORIGINAL HIERARCHY INFORMATION : "*JPN6* File2.xml"
   CHARACTER CODING : SJIS
STANDARD HIERARCHY INFORMATION : "*JPN6* File2.xml"
   FILE TYPE INFORMATION : SlideShowList <ENTRY 3>
ORIGINAL HIERARCHY INFORMATION : "*JPN7* File3.xml"
   CHARACTER CODING : SJIS
STANDARD HIERARCHY INFORMATION : "*JPN7* File3.xml"
   FILE TYPE INFORMATION : E-BookMetainfo <ENTRY 4>
ORIGINAL HIERARCHY INFORMATION : " Folder1/*JPN2*1.wav "
   CHARACTER CODING : SJIS
STANDARD HIERARCHY INFORMATION : " Folder1/*JPN2*1.wav "
   FILE TYPE INFORMATION : AudioData <ENTRY 5>
ORIGINAL HIERARCHY INFORMATION : " Folder1/*JPN2*2.wav "
   CHARACTER CODING : SJIS
STANDARD HIERARCHY INFORMATION : " Folder1/*JPN2*2.wav "
   FILE TYPE INFORMATION : AudioData

⋮
```

ENCODER, DECODER, THEIR METHODS, PROGRAMS THEREOF, AND RECORDING MEDIA HAVING PROGRAMS RECORDED THEREON

TECHNICAL FIELD

The present invention relates to encoders for encoding one or more files and/or their file hierarchy as a single archive file, decoders for restoring the initial file, file name, and file hierarchy from the archive file, their methods, programs of the methods, and recording media on which the programs are recorded.

BACKGROUND ART

A plurality of files are put into a single archive file with the file names and file hierarchy information retained, and the initial files, file names, and file hierarchy are restored from the archive file. FIG. 1A shows an example in which an encoder 10 collectively compresses a plurality of files and a folder in a folder (folder name "folder1") in directory C in an environment where Windows (registered trademark) is used as an OS (operating system) environment, into a single archive file ARC (file name "C:/folder1.archive"). The folder "folder1" contains a text file (file name "file1.text") and a folder "folder2". The folder "folder2" contains three files: file2*JPN1*EUC.wav (hereinafter *JPN1* indicates a Japanese kana and/or kanji character string that means "the Japanese language"), file3*JPN1*UTF-8.aiff, and file4*JPN1*SJIS.mp4. The whole of these folders and files in the file hierarchy will be referred to as a file set FS.

FIG. 1B illustrates that a decoder 20 decodes the archive file ARC generated as shown in FIG. 1A and expands it to the initial file set FS as shown in FIG. 1A. Known tools for compressing and restoring this type of hierarchical file set include GZIP and WinZIP. In the hierarchical file set illustrated as an example in FIGS. 1A and 1B, the files file2, file3, and file4 contain music data or video data, and the file names are recorded in a play list held in the file1 text file. If the file set FS is input to an application program such as a software music player, the software music player references the play list in file1 and successively selects music data files that can be played by the software music player from the folder2 folder and plays them.

DISCLOSURE OF THE INVENTION

Problems to be Solved by the Invention

Windows (registered trademark), Mac OS (registered trademark), and other OSs allow a file name using Japanese kana and/or kanji to be specified. However, the Japanese kana-kanji code that can be used depends on the OS: SJIS can be used on Windows; EUC or UTF-8 can be used on Linux (registered trademark); and UTF-8 can be used on Mac OS. The standard kana-kanji code depends on the OS. If an archive file formed by compressing a folder by WinZIP (registered trademark) on Windows is copied onto a Linux or Mac OS processing system, a recognizable Japanese file name cannot be restored.

With character codes based on a plurality of bytes, such as JIS, SJIS, and EUC, if each byte is processed, a character code assigned as a control code in ASCII may be included. This will prevent the characters from being read correctly and can also result in wrong decoding.

An object of the present invention is to provide an encoder, a decoder, their methods, programs of the methods, and recording media having the programs recorded thereon that allow the file names and hierarchy information to be read correctly even if the archive file created by the encoder on a given OS or file system (hereinafter called a system environment) is decoded in a different system environment.

Means to Solve the Problems

According to the present invention, an encoder for storing one or more files and/or one or more files contained in a folder, together with a file name and file hierarchy information, in a single archive file includes original hierarchy information generation means for recording a character string or symbol string by which a file name indicating the file hierarchy information of each file is represented in a non-ASCII special character coding, as original hierarchy information in the archive file; and standard hierarchy information generation means for converting the character string in the special character coding into a character string in a common standard character coding specified beforehand for different system environments and recording the converted character string as standard hierarchy information in the archive file.

According to the present invention, a decoder for restoring an initial file, file name, and file hierarchy from an archive file containing one or more files and/or one or more files contained in a folder together with the file name and file hierarchy information includes original hierarchy information decoding means for restoring, if a special character coding expressing the type of a character coding recorded in association with original hierarchy information in the file hierarchy information in the archive file is a character coding that can be used in a system environment in which decoding is performed, the original hierarchy information to a character string in the special character coding and for restoring the file name and file hierarchy; and standard hierarchy information decoding means for restoring, if the file hierarchy information in the archive file does not include the original hierarchy information or if the special character coding included in the original hierarchy information is not a character coding that can be used in the system environment in which decoding is performed, the file name and file hierarchy by converting a file name in a standard character coding indicated by standard hierarchy information in the archive file to a file name in the character coding that can be used in the system environment.

Effects of the Invention

Since the encoder records both the original hierarchy information and the standard hierarchy information in the archive file, if the special character coding used in the original hierarchy information cannot be used, the decoder can restore a file name from the standard hierarchy information.

BRIEF DESCRIPTION OF THE DRAWINGS

FIG. 1A is a diagram showing the relationship between a file set and an archive file generated by encoding the file set;

FIG. 1B is a diagram showing the relationship between the archive file and a file set generated by decoding the archive file;

FIG. 6-1 is a view showing an example of forming meta information by using a structured language (1/3);

FIG. 6-2 is a view showing the example of forming the meta information by using the structured language (2/3);

FIG. 6-3 is a view showing the example of forming the meta information by using the structured language (3/3);

FIG. 11A shows an example of file attribute information on Windows/NTFS;

FIG. 11B shows an example of file attribute information on Mac OS/UFS;

FIG. 11C shows an example of standard file attribute information;

FIG. 18 is a view showing an example of archive file information; and

BEST MODES FOR CARRYING OUT THE INVENTION

First Embodiment

Encoder

Figure 1:
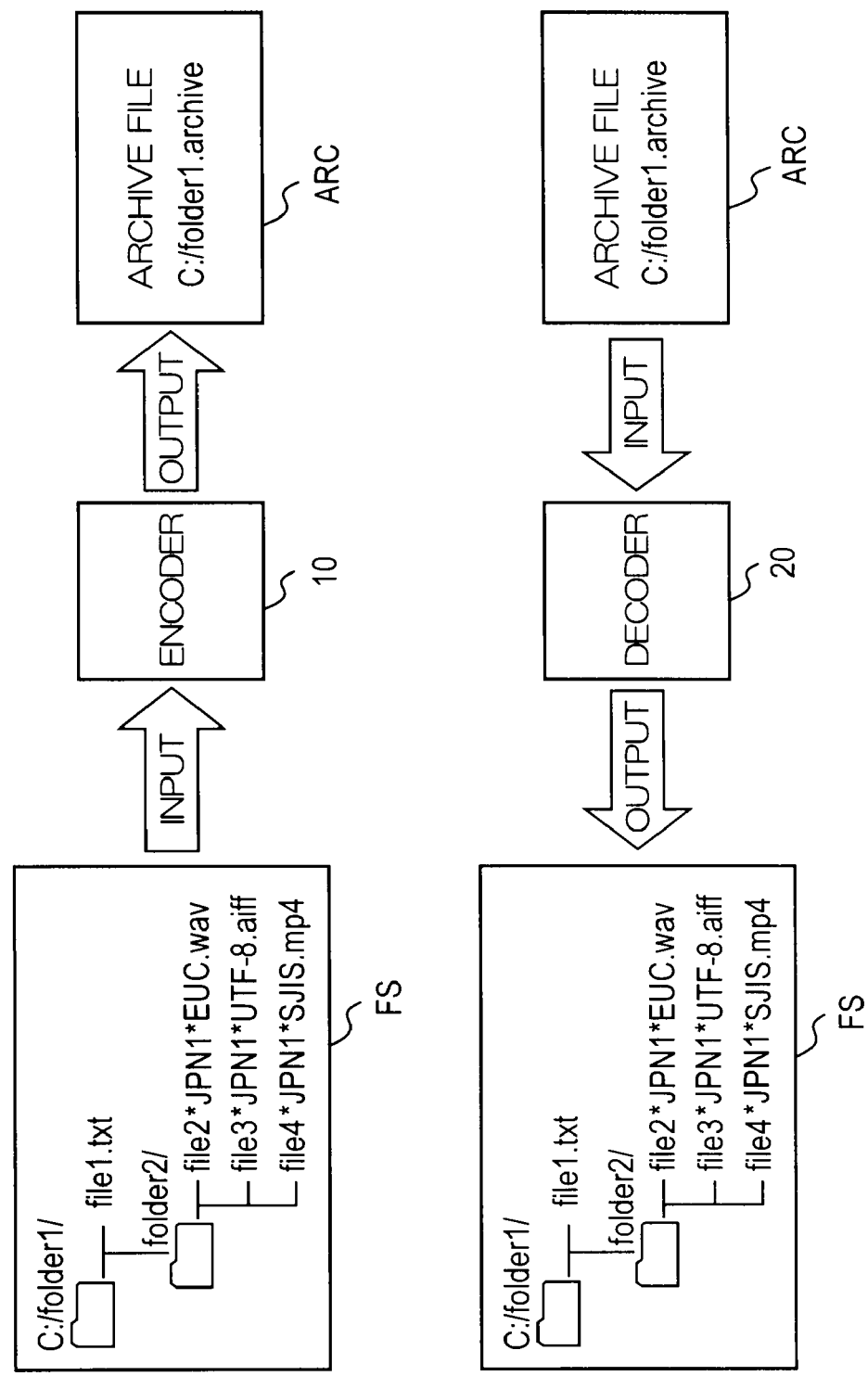
Figure 2:
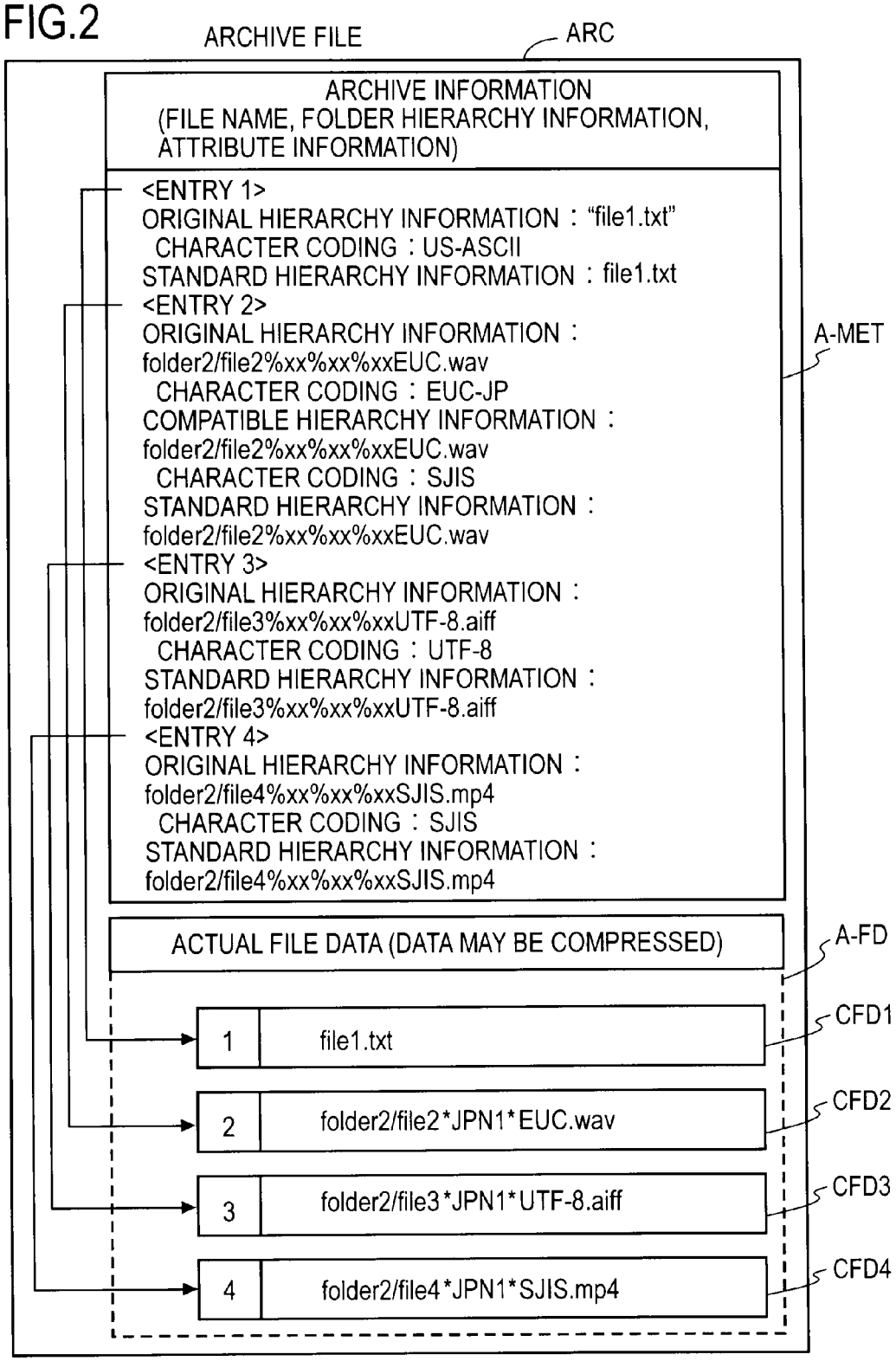
FIG. 2 is a diagram showing an example structure of the archive file according to the present invention.
Figure 3:
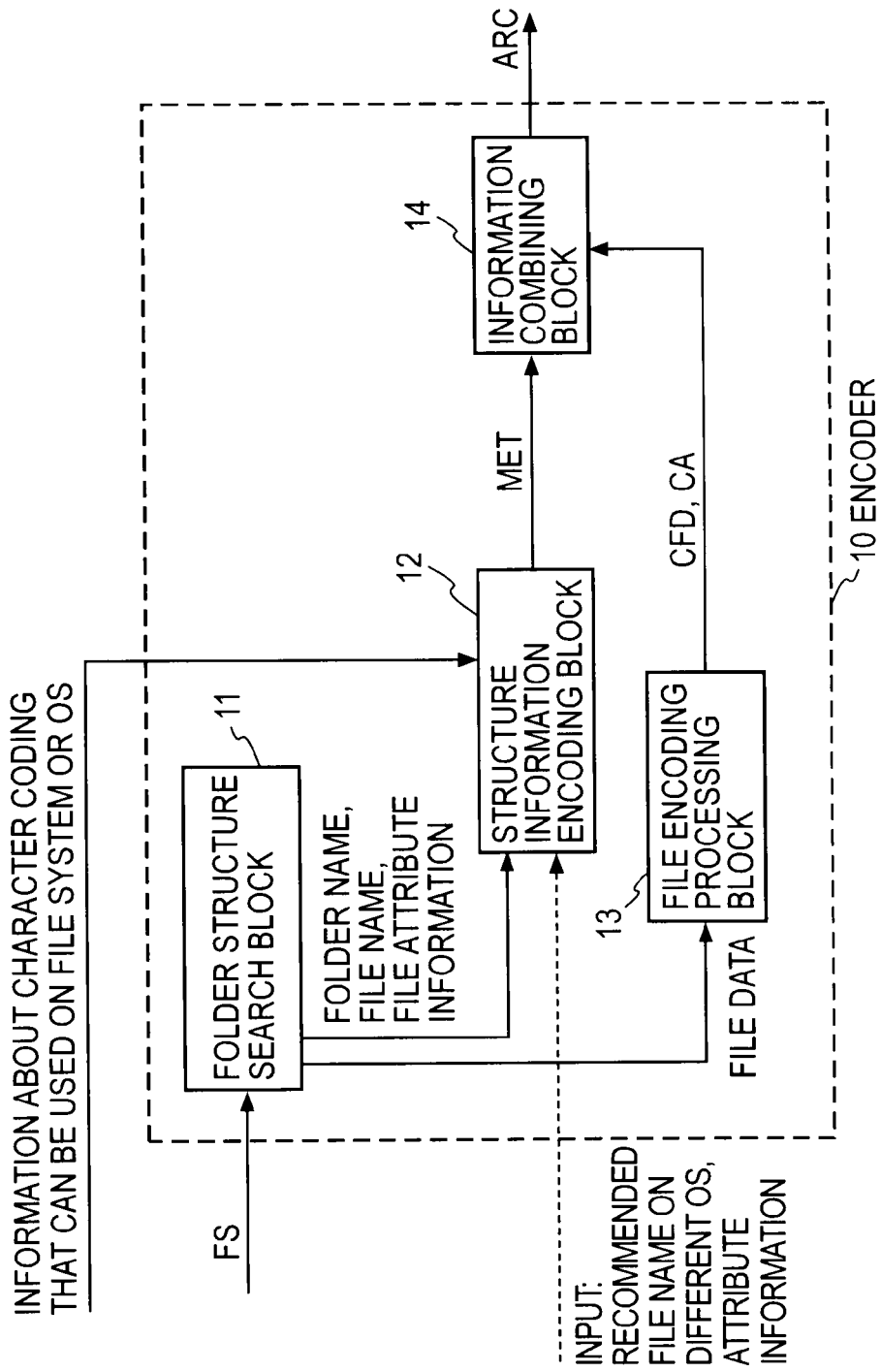
FIG. 3 is a functional block diagram of an encoder according to the present invention.

FIG. 2 shows an example of an archive file generated by an encoder according to the present invention, by encoding the file set FS shown in FIG. 1, and FIG. 3 shows an example of the functional structure of the encoder. The encoder 10 receives information indicating one or more files or information indicating a target root folder and outputs a single archive file containing the given files or hierarchical files and/or folders in the root folder.

The encoder 10 of the present invention is implemented on a computer running on a certain OS or file system (system environment) and includes a folder structure search block 11, a structure information encoding block 12, a file encoding processing block 13, and an information combining block 14. The structure information encoding block 12 is given character code information that can be used in the system environment. The folder structure search block 11 is given information indicating the root folder of the file set FS to be archived and detects folder structure information such as a file hierarchy, file names, folder names, and file attribute information, and file data (actual binary data, referred to as actual data file), from the file set FS.

The structure information encoding block 12 encodes the detected folder structure information with an encoding method according to the present invention and outputs the result as meta information MET. The file encoding processing block 13 applies encoding (such as data compression) to the detected file data and outputs encoded file data CFD and encoding algorithm information CA. The information combining block 14 combines the meta information MET from the structure information encoding block 12 with the encoded file data CFD and encoding algorithm information CA from the file encoding processing block 13 and outputs an archive file ARC.

In a detailed description given below, the file set FS in the root folder "folder1" shown in FIG. 1A will be explained as an encode target. When "C:/folder1" is given as root folder information of the target to the encoder 10, the encoder 10 starts encoding the folder and the files under C:/folder1 on the file system.

The folder structure search block 11 searches for all of the folder and the files under the root folder "C:/folder1" and stores the actual binary data of the files, the file names of the files, and hierarchy information representing the relative positions of the files with respect to the root folder in combination. As the hierarchy information, a path name is used, for instance.

The character coding of a character string that can be used as a file name or a path name depends on the OS and the file system. For example, ASCII coding and SJIS coding can be used on Windows while ASCII coding and UTF-8 coding are used on Mac OS. On Linux, some systems use ASCII coding and UTF-8 coding, and some other systems use ASCII coding and EUC coding. There are also some processing systems that can recognize just ASCII coding.

Figure 4:
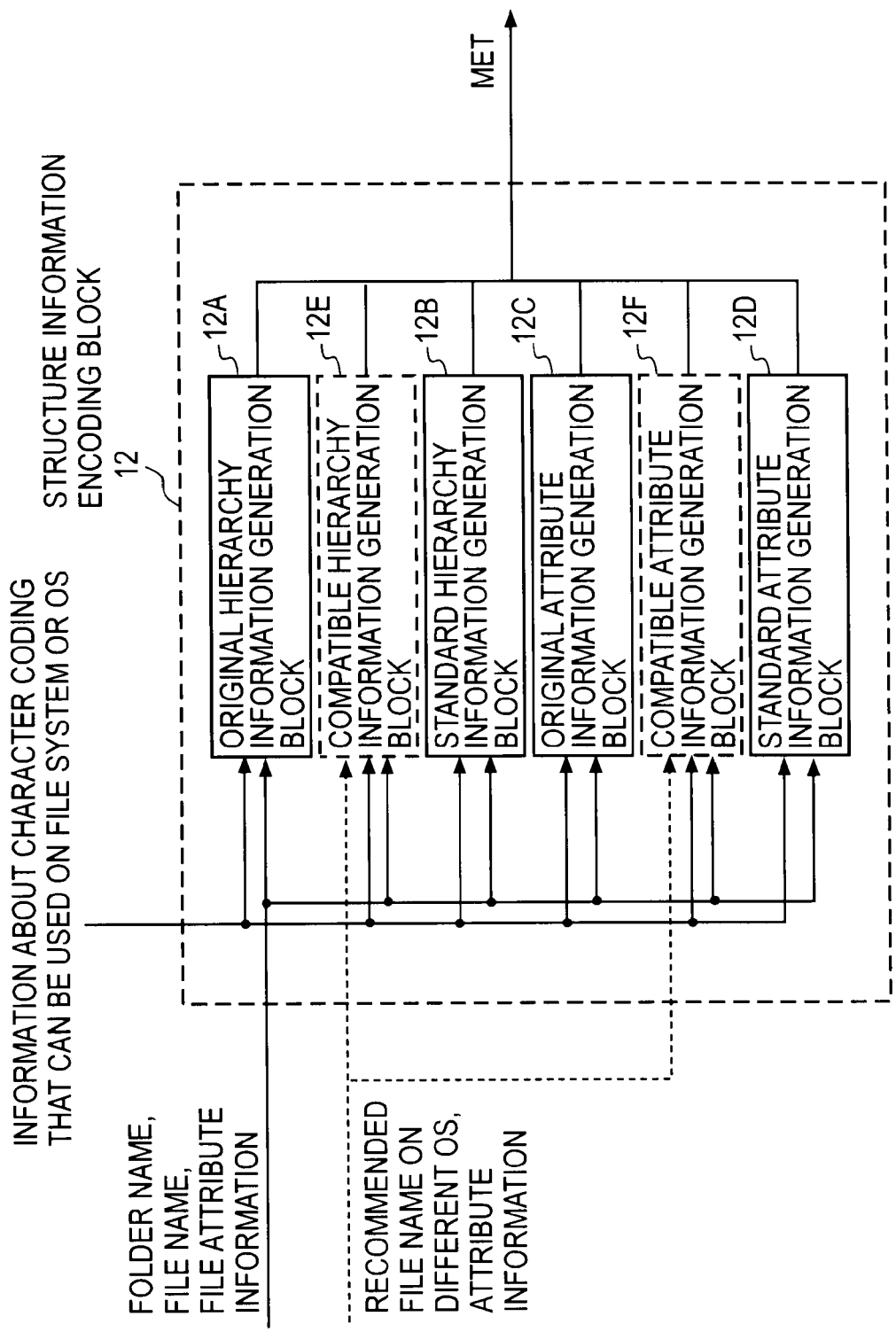
FIG. 4 is a functional block diagram of a structure information encoding block 12 in FIG. 3.
Figure 5:
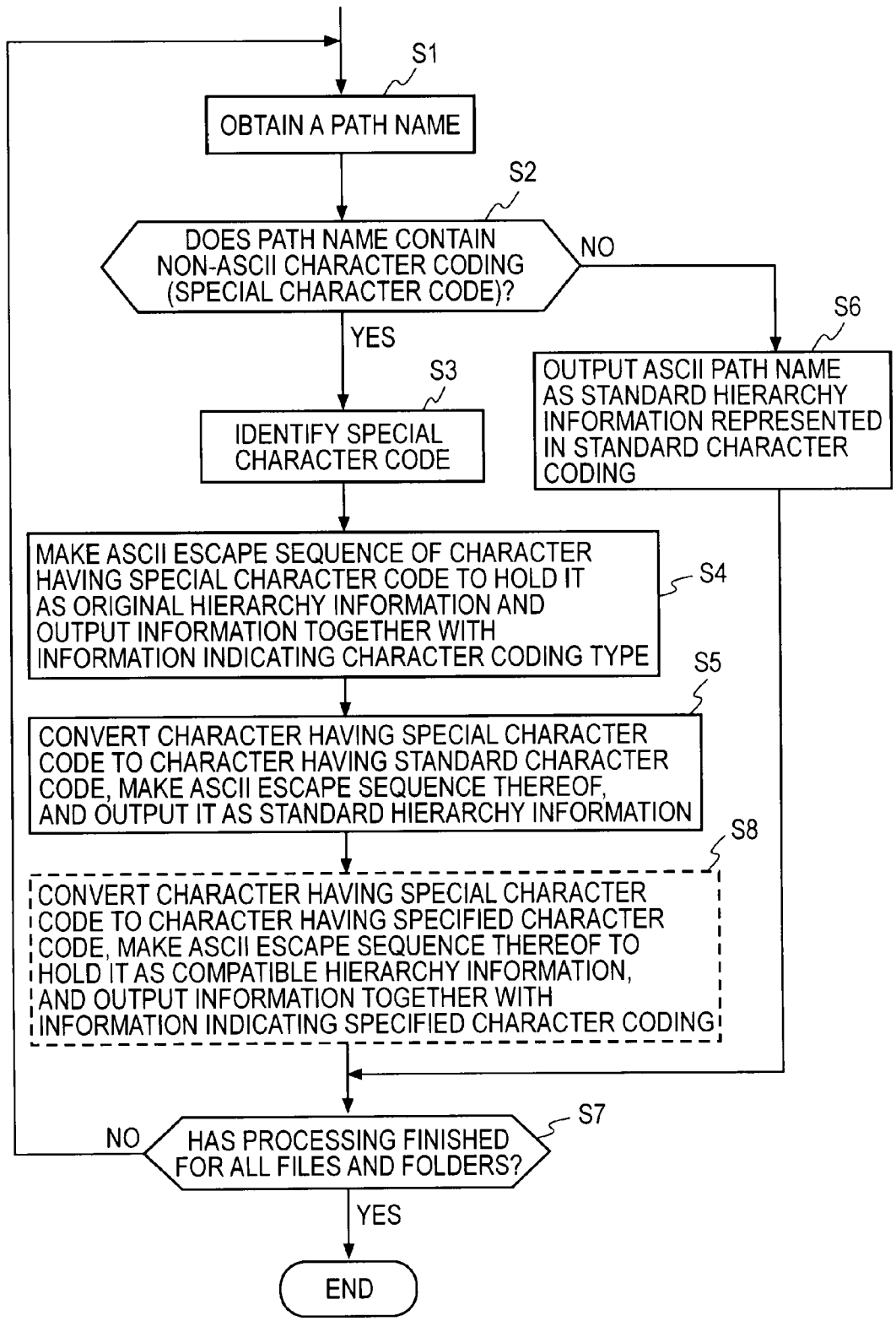
FIG. 5 is a flowchart showing processing in the structure information encoding block.

FIG. 4 shows a functional configuration of the structure information encoding block 12, which is an important part of the present invention, and FIG. 5 is a flowchart showing the processing in the block. The structure information encoding block 12 includes an original hierarchy information generation block 12A, a standard hierarchy information generation block 12B, an original attribute information generation block 12C, and a standard attribute information generation block 12D. The blocks are given information about the character coding that can be used on the OS or file system. If necessary, attribute information or a recommended file name (compatible hierarchy information) on another OS or file system may be given.

The standard character coding used in the present invention is a predetermined common character coding to express a character string representing hierarchy information, irrespective of the OS. Any character coding, such as UTF-8, can be used as the standard character coding.

Processing described below is performed for all folders and files under the root folder. In the processing described below, hierarchy information expressed as a path name containing a file name is written directly as meta information. The meta information can also be written by using a structured language such as XML, as shown in FIGS. 6-1 to 6-3, and the hierarchy information can be included in the meta information by the hierarchy description.

Step S1: A path name is obtained from the folder structure search block 11.

Step S2: It is judged whether the path name contains a non-ASCII character code (such as the character codes of the part "*JPN1*" in the files file2, file3, and file4 shown in FIG. 1; the codes will be referred to as special character codes).

Step S3: If a non-ASCII special character code is included in the path name, the type of the special character code is identified.

Step S4: The original hierarchy information generation block 12A converts the special character code into a form that can be expressed just by ASCII codes (hereinafter called an ASCII escape sequence, which will be described later) and holds it as the original hierarchy information in combination with information representing the type of the special character code, in an entry corresponding to the path name, in the archive file ARC held in the information combining block 14.

Step S5: The standard hierarchy information generation block 12B converts the character of the special character code to the standard character code, makes an ASCII escape sequence of the converted character string, and holds the result as the standard hierarchy information in the same entry as the one indicated above, in the archive file ARC.

Step S6: If it is judged in step S2 that no special character code is included, the path name of the ASCII code is held as the standard hierarchy information in the same entry. If the path name contains a special code such as a control code, an ASCII escape sequence is made to provide the standard hierarchy information.

Step S7: It is judged whether processing of all files and folders has finished. If not, the processing returns to step S1 to perform the same processing for another path name. If the processing of all files and folders has finished, encoding of the structure information ends.

It is determined in step S3 that the file name (path name) "file1.txt" in the file set FS shown in FIG. 1A uses US-ASCII coding as the special character coding in the character string of the file name. In entry 1 in the meta information field A-MET of the archive file ARC, "US-ASCII" is written as the character coding, as shown in FIG. 2. The original hierarchy information generated in step S4 is indicated as "file1.txt" in entry 1 as well. The standard hierarchy information generated in step S5 is also indicated as "file1.txt" in entry 1.

As for the file name (path name) "folder2/file2*JPN1*EUC.wav" in the file set FS, it is determined in step S3 that the character string of the file name uses EUC-JP coding as the special character coding. In entry 2 in the meta information field A-MET of the archive file ARC, "EUC-JP" is written as the character coding. The original hierarchy information generated in step S4 is indicated as "folder2/file2%xx%xx%xxEUC.wav" in entry 2. The standard hierarchy information generated in step S5 is indicated as "folder2/file2%xx%xx%xxEUC.wav" in entry 2 as well.

As for the file name (path name) "folder2/file3*JPN1*UTF-8.aiff" in the file set FS, it is determined in step S3 that the character string of the file name uses UTF-8 coding as the special character coding. In entry 3 in the meta information field A-MET of the archive file ARC, "UTF-8" is written as the character coding. The original hierarchy information generated in step S4 is indicated as "folder2/file3%xx%xx%xxUTF-8.aiff" in entry 3, and the standard hierarchy information generated in step S5 is indicated as "folder2/file3%xx%xx%xxUTF-8.aiff" in entry 3 as well.

As for the file name (path name) "folder2/file4*JPN1*SJIS.mp4" in the file set FS, it is determined in step S3 that the character string of the file name uses SJIS coding as the special character coding. In entry 4 in the meta information field A-MET in the archive file ARC, "SJIS" is written as the character coding. The original hierarchy information generated in step S4 is indicated as "folder2/file4%xx%xx%xxSJIS.mp4" in entry 4, and the standard hierarchy information generated in step S5 is indicated as "folder2/file4%xx%xx%xxSJIS.mp4" in entry 4 as well.

As the method carried out in step S4 or S5 to make an ASCII escape sequence, a method of converting the file name first into Base64 coding then into ASCII coding can be used. Another method that can be used is to replace each character of the special character coding expressed by two bytes, such as a Japanese character coding, as shown in FIG. 2, with a symbol "%" followed by a pair of ASCII code characters (expressed as "xx"), converted from each byte of the two-byte single special character code. In the archive file shown in FIG. 2, the latter method is taken to make the ASCII escape sequences.

The data of the four files "file1.txt", "folder2/file2*JPN1*EUC.wav", "folder2/file3*JPN1*UTF-8.aiff", and "folder2/file4*JPN1*SJIS.mp4" detected by the folder structure search block 11 are encoded separately by the file encoding processing block 13. The encoded file data CFD1 to CFD4 are held in the file data field A-FD of the archive file, corresponding to the entry numbers. The file data may be compressed. The encoding algorithm used is recorded as encoding algorithm information CA in the corresponding entry of the meta information field A-MET (not shown in the figure).

The information combining block 14 combines the meta information MET from the structure information encoding block 12 with the encoded file data CFD from the file encoding processing block 13, holds them in the single archive file ARC, as shown in FIG. 2, and outputs the archive file.

As shown in FIG. 5, it is judged in steps S2 and S6 whether the path name contains a non-ASCII special character code, and original hierarchy information is generated if any special character code is contained. The original hierarchy information may also be generated even if the path name is formed just of ASCII codes. In that case, the ASCII coded character string may be handled directly as the original hierarchy information before or after step S6 and output together with information indicating the character coding type US-ASCII. The ASCII coded character string may be changed to an ASCII escape sequence to provide it as the original hierarchy information.

Figure 7:
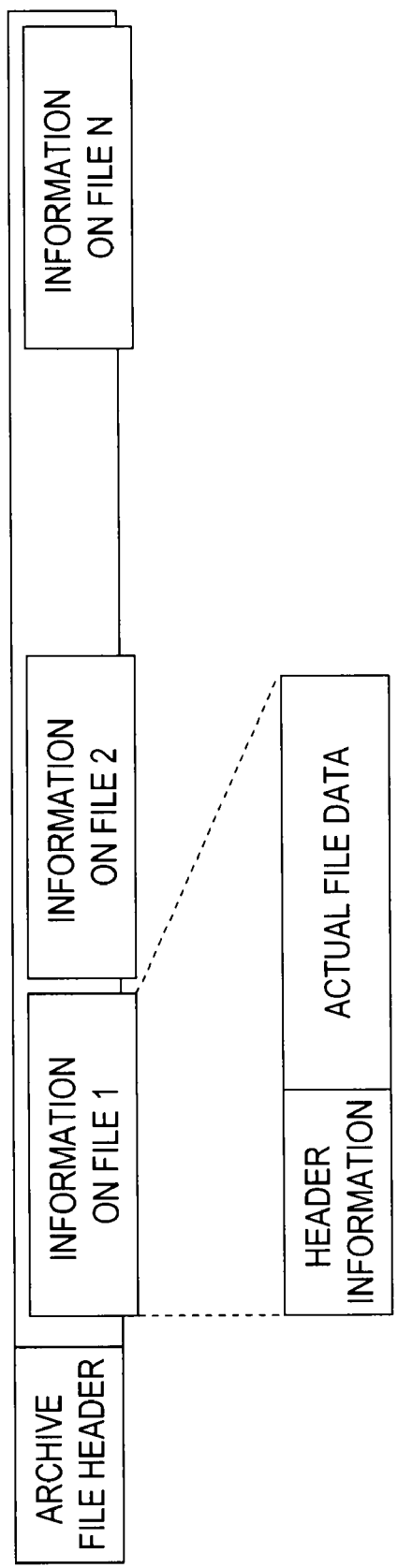
FIG. 7 is a diagram showing another example structure of the archive file according to the present invention.

In the flow of the processing performed by the structure information encoding block 12, as described above, an ASCII escape sequence of a character string expressed by the special character coding, standard character coding, or the like is made, so that the corresponding hierarchy information can be written as text in the meta information field (A-MET) of the archive file structured as shown in FIG. 2. The archive file, however, can be structured to have the meta information containing the hierarchy information as header information of the actual file data, as shown in FIG. 7. In that case, the hierarchy information can be binary data and does not need to be changed to an ASCII escape sequence.

Decoder

Figure 8:
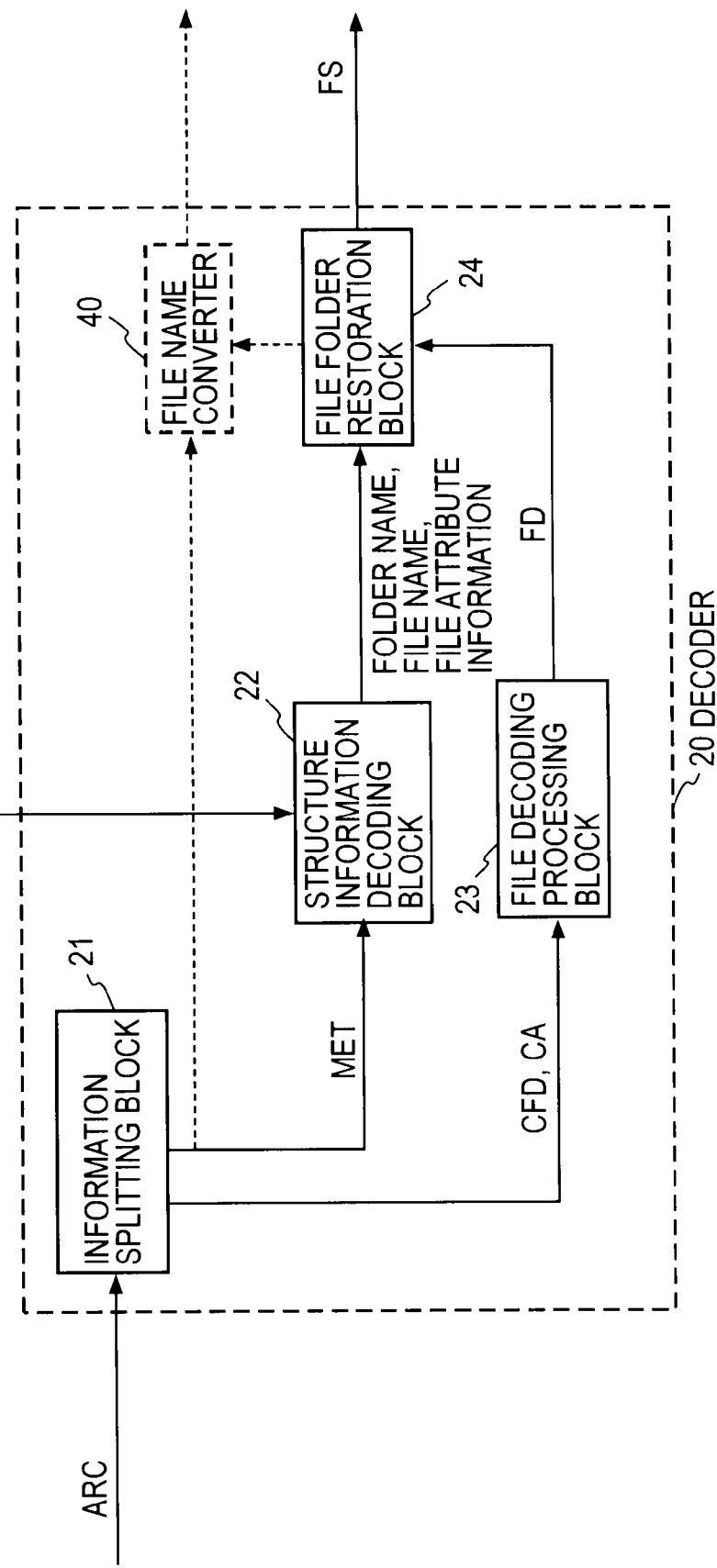
FIG. 8 is a functional block diagram of a decoder according to the present invention.

FIG. 8 shows a functional configuration of an archive-file decoder according to the present invention. The decoder 20 includes an information splitting block 21, a structure information decoding block 22, a file decoding processing block 23, and a file folder restoration block 24. The decoder 20 receives the archive file ARC, restores the files, the folders, and the file hierarchy from the information in the archive file ARC, and outputs the result as the file set FS.

The archive file ARC is generated by encoding by the encoder 10 described earlier, and the archive file contains the actual data, file name, and file hierarchy information of each file. The decoder according to the present invention expands and restores the encoded file data in the initial hierarchical structure by using the file hierarchy information in each file entry in the archive file.

The information splitting block 21 splits the input archive file ARC into hierarchy information (meta information) MET, which will be given to the structure information decoding block 22, and the encoded file data CFD and the encoding algorithm information CA, which will be given to the file decoding processing block 23. The structure information decoding block 22 restores the folder names, the file names (path names), and the hierarchy in accordance with the given hierarchy information MET and sends them to the file folder restoration block 24. The file decoding processing block 23 restores file data FD by decoding the encoded file data CFD in accordance with the given encoded file data CFD and the encoding algorithm information CA and sends the restored data to the file folder restoration block 24. The file folder restoration block 24 restores the initial files and folders by associating the given folder names, file names, attributes, and file data in accordance with the given hierarchy information and outputs the result as the file set FS.

Figure 9:
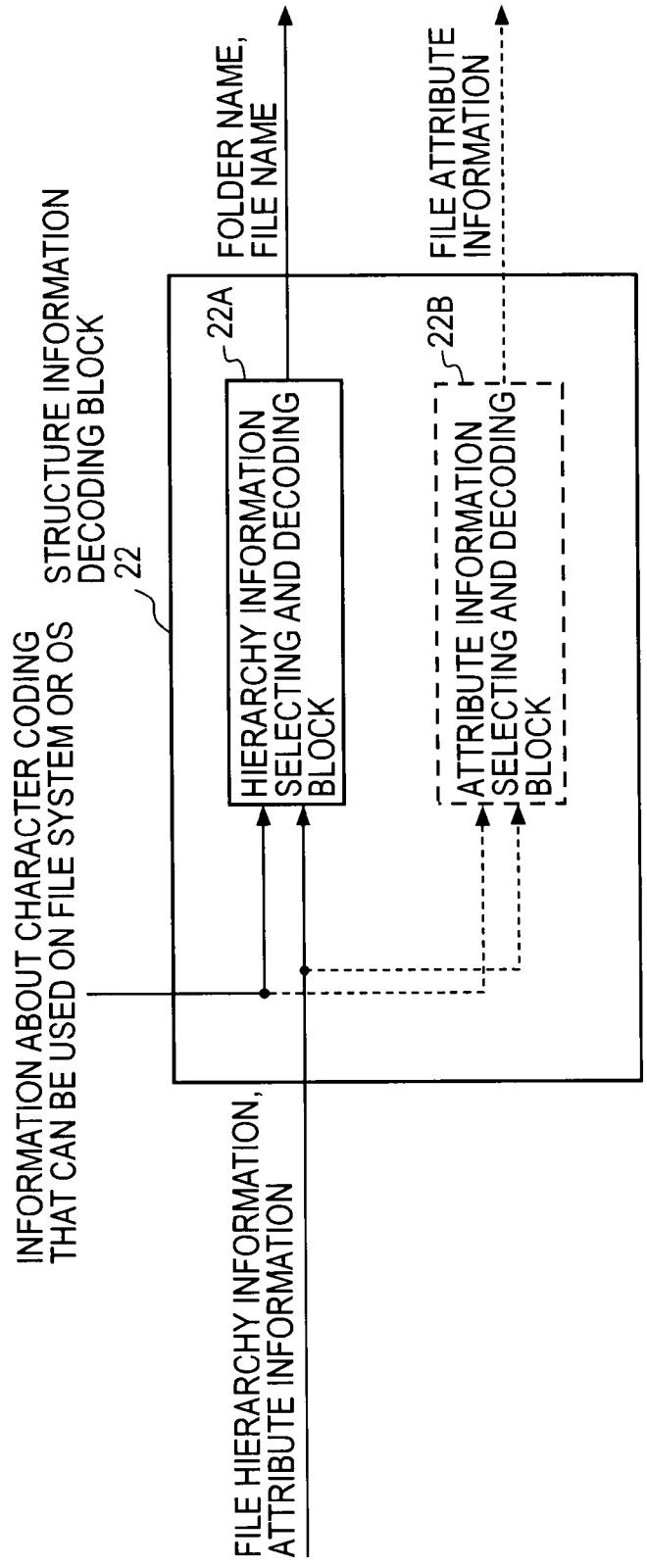
FIG. 9 is a functional block diagram of a structure information decoding block 22 in FIG. 8.
Figure 10:
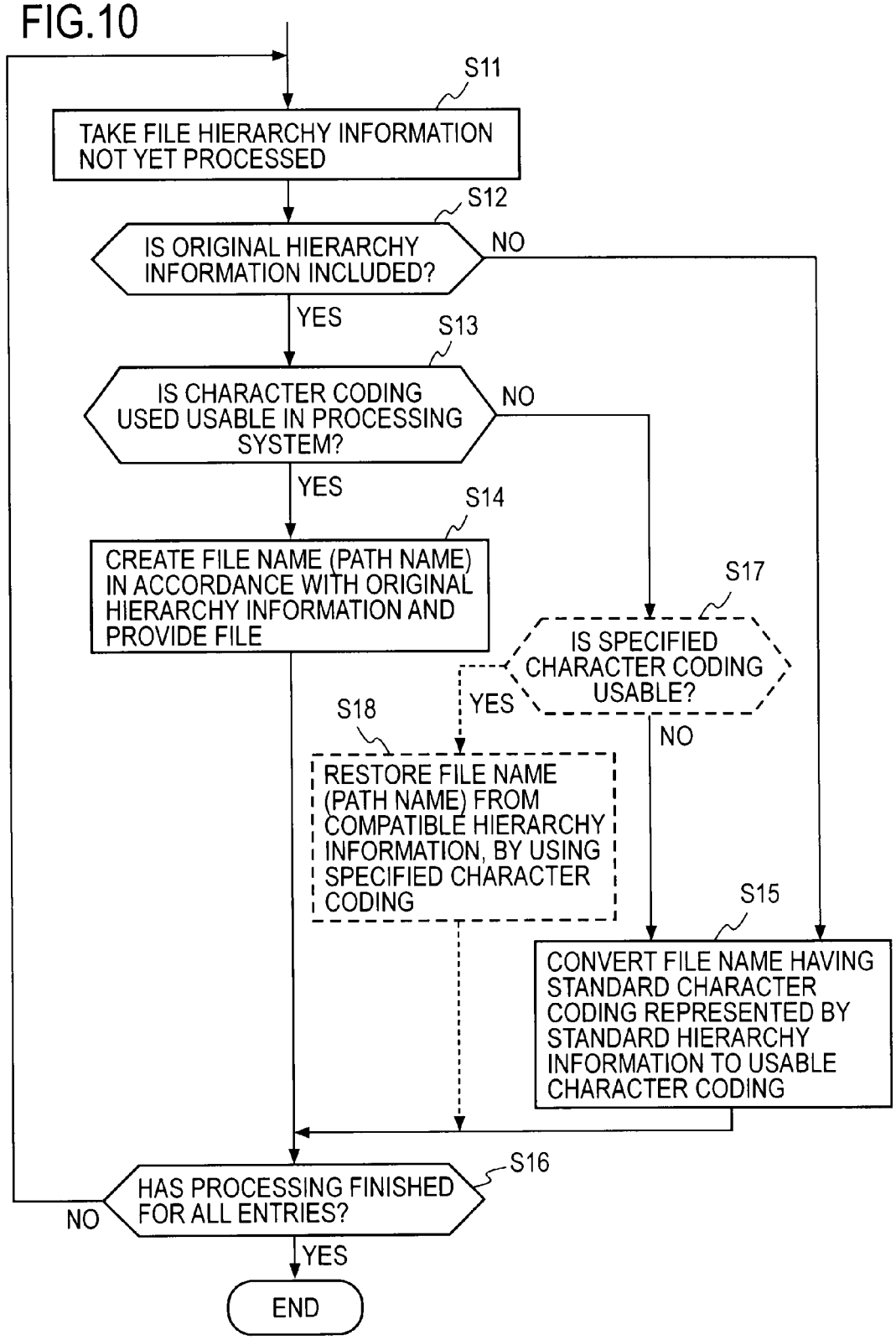
FIG. 10 is a flowchart showing processing in the structure information decoding block.

FIG. 9 shows a functional configuration of the structure information decoding block 22, and FIG. 10 is a flowchart showing processing in the block. The structure information decoding block 22 is given information about a character coding that can be used on the OS or file system in an environment in which the decoder 20 is used. The structure information decoding block 22 includes a hierarchy information selecting and decoding block 22A.

The structure information decoding block 22 performs the processing described below, for all the files and folders included in the archive file.

Step S11: The hierarchy information selecting and decoding block 22A takes hierarchy information from an entry which has not yet been processed.

Step S12: It is judged whether the hierarchy information includes original hierarchy information. If Yes, the processing proceeds to step S13. If No, the processing proceeds to step S15.

Step S13: The type of the character coding used is obtained. It is judged whether the original hierarchy information uses a character coding that can be used in file names in the processing system (system environment).

Step S14: If it is judged in step S13 that the character coding is usable, the file name (path name) is created in accordance with the original hierarchy information. The file decoding processing block 23 restores the file data (actual data), and the processing proceeds to step S16.

Step S15: If it is judged in step S12 that no original hierarchy information is included or if it is judged in step S13 that the character coding is not usable, the file name (path name) with the standard character coding expressed by the standard hierarchy information is converted to a file name (path name) with a character coding that can be used in the system environment. The file decoding processing block 23 restores the file data (actual data), and the processing goes to step S16.

Step S16: It is judged whether the processing has finished for all entries. If not, the processing returns to step S11, and the same steps are repeated. If the processing has finished, the decoding processing ends.

In steps S14 and S15, if the binary data (actual data) of the file has been compressed, the file data is restored by an expansion algorithm corresponding to the encoding algorithm (compression algorithm).

The file hierarchy restore processing in step S14 is a reversal of the processing in step S4 shown in FIG. 5. In the original hierarchy information "folder2/file2%xx%xx%xxEUC.wav" in entry 2 in the archive file shown in FIG. 2, for example, "xx" following each "%" is converted to a single EUC-JP character code specified in entry 2, and "%" is deleted. In step S15, the hierarchical structure of the file is restored in the same way as in step S14, by using the standard character coding that has been specified beforehand for the archive file as described before.

According to the present invention, if a file name uses a special character coding, at least the original hierarchy information and the standard hierarchy information expressing the file name are provided in the archive file in encoding, as described above. In decoding, if the decoder can handle the character coding specified for the original hierarchy information, the file name and hierarchical structure can be restored correctly by using that character coding. If the specified character coding is not available, the file name and hierarchical structure can be restored from the standard hierarchy information.

First Modified Embodiment

In the embodiment described above, the hierarchy information of each file may be generated by specifying a character coding recommended for a certain combination (or combinations) of particular OS and file system that will be used, so that the possibility of restoring the file name on the OS or file system will be improved. In that case, a compatible hierarchy information generation block 12E is provided in the structure information encoding block 12 of the encoder 10, as indicated by a dashed line in FIG. 4, and the recommended specified character coding information is given. This requires an additional step in FIG. 5 before step S3, after step S4, or after step S5. In FIG. 5, this step is added as step S8, following step S5, as indicated by a dashed line. In that step, a special character code in the file name is converted to a specified character code, an ASCII escape sequence is made, compatible hierarchy information is generated, and the information is output together with information indicating the specified character coding, to the archive file. FIG. 2 shows an example in which SJIS coding is used as the specified character coding for the file in entry 2, and compatible hierarchy information "folder2/file2%xx%xx%xxEUC.wav" is generated. In entries 3 and 4, similar compatible hierarchy information is provided, which is not shown in the figure.

The processing in the hierarchy information selecting and decoding block 22A of the decoder 20 includes steps S17 and S18, as indicated by dashed lines in FIG. 10. If it is judged in step S13 that the type of the special character coding used in the file name cannot be used in the system environment (OS or file system) where the decoder is used, the processing does not go to step S15. It is judged in step S17 whether the character coding specified in the compatible hierarchy information is included in the character coding types that can be used in the system environment. If yes, by using the specified character coding, the file name and hierarchy information are restored in step S18 by converting the character string changed to the ASCII escape sequence of the compatible hierarchy information to a character string of the specified character coding, and then the processing goes to step S16. If it is judged in step S17 that the specified character coding cannot be used, the processing goes to step S15.

By providing the compatible hierarchy information in the archive file, the general versatility of the archive file can be improved accordingly.

The encoder may generate a plurality of pieces of compatible hierarchy information corresponding to different OSs or file systems and hold the information in the archive file.

The ASCII escape sequence is made from the character string represented in the specified character coding to allow the hierarchy information to be written in the text-based meta information field (A-MET) of the archive file configured as shown in FIG. 2, in the same manner as in the first embodiment. If the archive file is configured to hold the meta information including the hierarchy information as header information of the actual file data, the need for making an ASCII escape sequence is eliminated.

Second Modified Embodiment

Described above is an embodiment for solving the problem of a file name not being displayed correctly on a different OS or file system. The same problem occurs in file attribute information added to the file. Since some information that should be held as file attribute information depends on the OS or file system, if an archive file is moved and expanded on a different OS or file system, it may be impossible to specify a correct attribute. For example, FIG. 11A shows an example of attribute information used on Windows/NTFS, and FIG. 11B shows an example of attribute information used on Mac OS/UFS and Linux/UFS. The Windows/NTFS file attributes include "read-only," and the corresponding attribute on Mac OS/UFS and Linux/UFS is "owner read". As for "update date and time" and "creation date and time" on Windows/NTFS, Mac OS/UFS and Linux/UFS have the same attributes. Windows/NTFS has "hidden file" and "access date and time", whereas neither Mac OS/UFS nor Linux/UFS has corresponding attributes. Mac OS/UFS and Linux/UFS have "owner write" and "owner execute", whereas Windows/NTFS does not have corresponding attributes.

Also for handling file attribute information, the encoder 10 shown in FIG. 3 includes the original attribute information generation block 12C, the standard attribute information generation block 12D, and a compatible attribute information generation block 12F in the structure information encoding block 12, as shown in FIG. 4. A list of standard file attributes is predetermined, as shown in FIG. 11C. In the example shown, the standard file attributes include "owner read", "owner write", "owner execute", and "update date and time".

As shown in FIG. 3, the folder structure search block 11 reads the attributes of each file and gives them to the structure information encoding block 12. The original attribute information generation block 12C in the structure information encoding block 12 generates original attribute information from the given file attributes and information of the OS or file system. If the given file attributes correspond to standard file attributes (FIG. 11C), the standard attribute information generation block 12D generates standard attribute information therefrom. The encoder on a certain OS or file system may optionally specify a file attribute on a different particular OS or file system. In that case, the compatible attribute information generation block 12F generates compatible attribute information from a combination of the specified file attribute and information of the OS or file system. In entry 2 shown in FIG. 2, for example, the original attribute information, standard attribute information, and compatible attribute information of the file are added as shown below.

<Entry 2>
Original hierarchy information: folder2/file2%xx%xx%xxEUC.wav
   Character coding: EUC-JP
   Original attribute information:
Compatible hierarchy information: folder2/file2%xx%xx%xxEUC.wav
   Character coding: SJIS
   Compatible attribute information:
Standard hierarchy information: folder2/file2%xx%xx%xxEUC.wav
   Standard attribute information:
Similar additions are also made in entry 3 and entry 4.

The decoder 20 has an attribute information selecting and decoding block 22B in the structure information decoding block 22, as shown in FIG. 9. If each entry of an archive file has original attribute information or compatible attribute information suitable for the environment of the decoder, that is, compatible for the OS or file system, the information is selected. If such information is not found, standard attribute information is converted to a corresponding file attribute that can be used in the system environment, and the attribute is output. In that case, the file folder restoration block 24 rewrites the attribute information of the expanded file to the converted attribute information.

Also for a file attribute, the original attribute information and standard attribute information, and, if necessary, compatible attribute information thereof are held in the archive file. Because the decoder can select file attribute information that can be used in the environment of the OS or file system, file attribute errors associated with an archive file can be reduced even if the file is moved to a different OS or file system. If the compatible attribute information is used as well, the file attribute errors can be further reduced.

Second Embodiment

Figure 12:
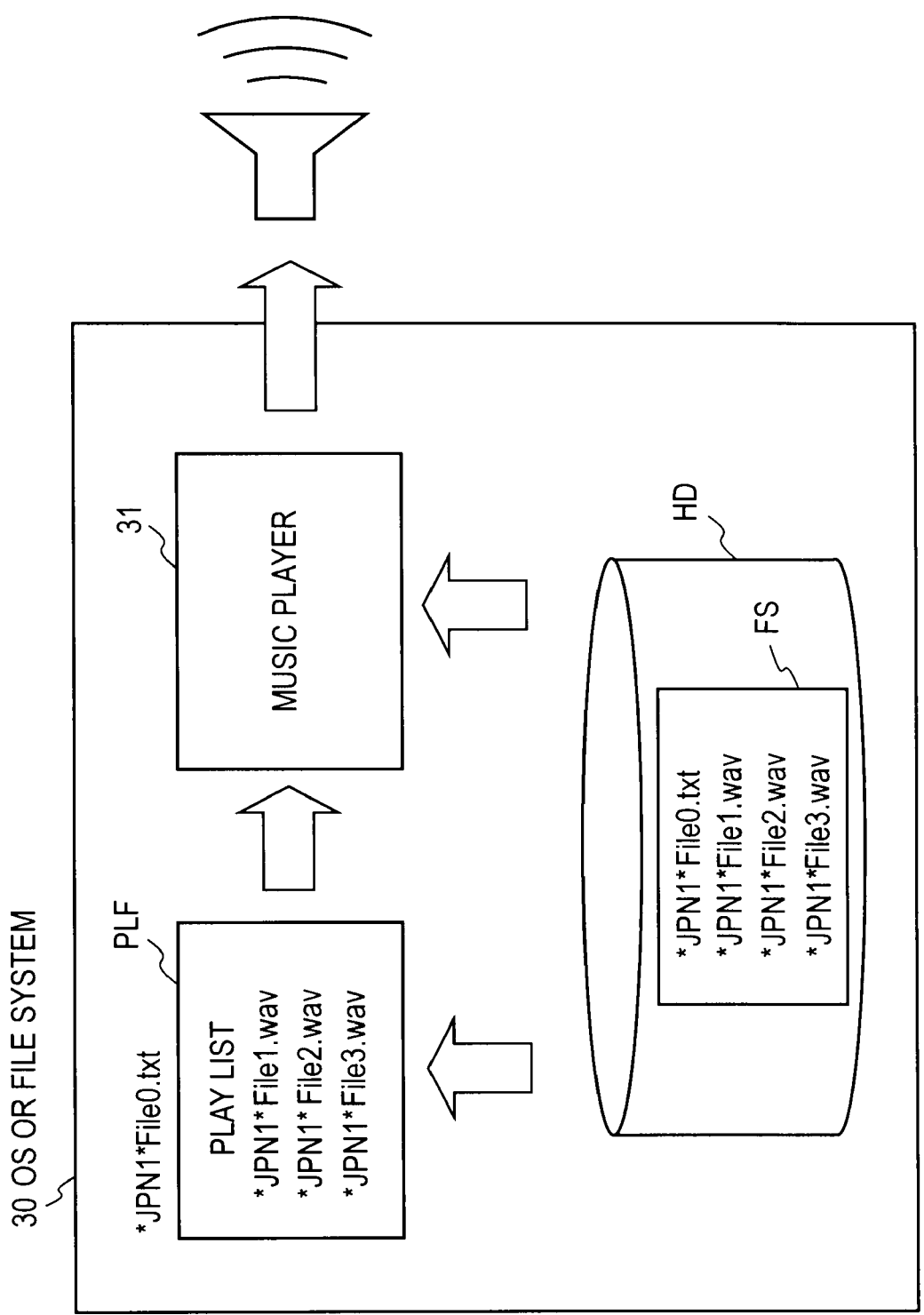
FIG. 12 is a diagram showing an example of a system for playing music data files in accordance with a play list.

By putting together one or more files and/or folders into a single archive file, as described earlier, data can be handled more easily. Archiving files and folders is useful. Suppose that the decoder described earlier obtains a file set FS by expanding a single archive file containing a play list file and music data files on a certain OS or file system and that the file set FS is held in a storage apparatus, such as a hard disk HD, on the OS or file system 30, as shown in FIG. 12. The shown file set FS contains "*JPN1*file0.txt" (hereinafter called a play list file PLF), in which the play list is written, and three music data files "*JPN1*file1.wav", "*JPN1*file2.wav", and "*JPN1*file3.wav". The file "*JPN1*file0.txt" contains a play list including the file names "*JPN1*file1.wav", "*JPN1*file2.wav", and "*JPN1*file3.wav".

When a play list read from the play list file PLF is input to a music player (software player) 31 provided as application software, the music player 31 references the play list file PLF and plays music data files corresponding to the listed music data file names (hereinafter called a reference file names) in the order in which they are listed. If the file set FS has been expanded by the decoder 20 described earlier in accordance with the original hierarchy information, the reference file names listed in the play list file PLF match the file names (actual data file names) of the music data files (actual data files) in the file set FS. This will cause no problem in playback.

If the file set FS has been expanded by the decoder 20 in accordance with the compatible hierarchy information or standard hierarchy information, the file names of the actual data files are converted using the specified character coding or selected character coding. This will cause a mismatch between the music data file names (reference file names) listed in the play list file PLF and the actual data file names. As a result, the music player will not be able to find the actual music data files to be played, and playback becomes impossible.

A file name converter and method of this embodiment converts the reference file names to the same names as the actual data file names.

Figure 13:
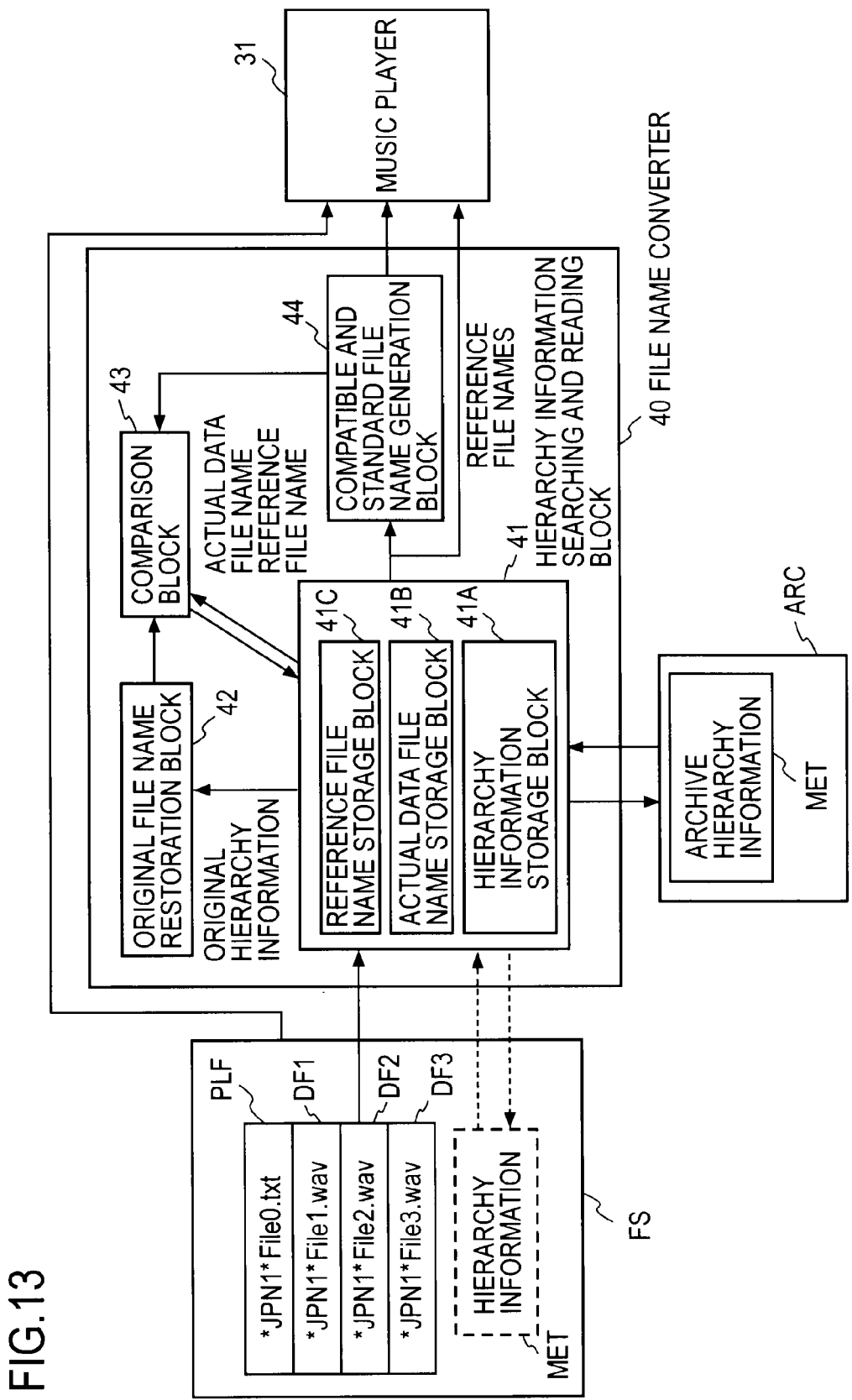
FIG. 13 is a functional block diagram of a file name converter according to the present invention.
Figure 14:
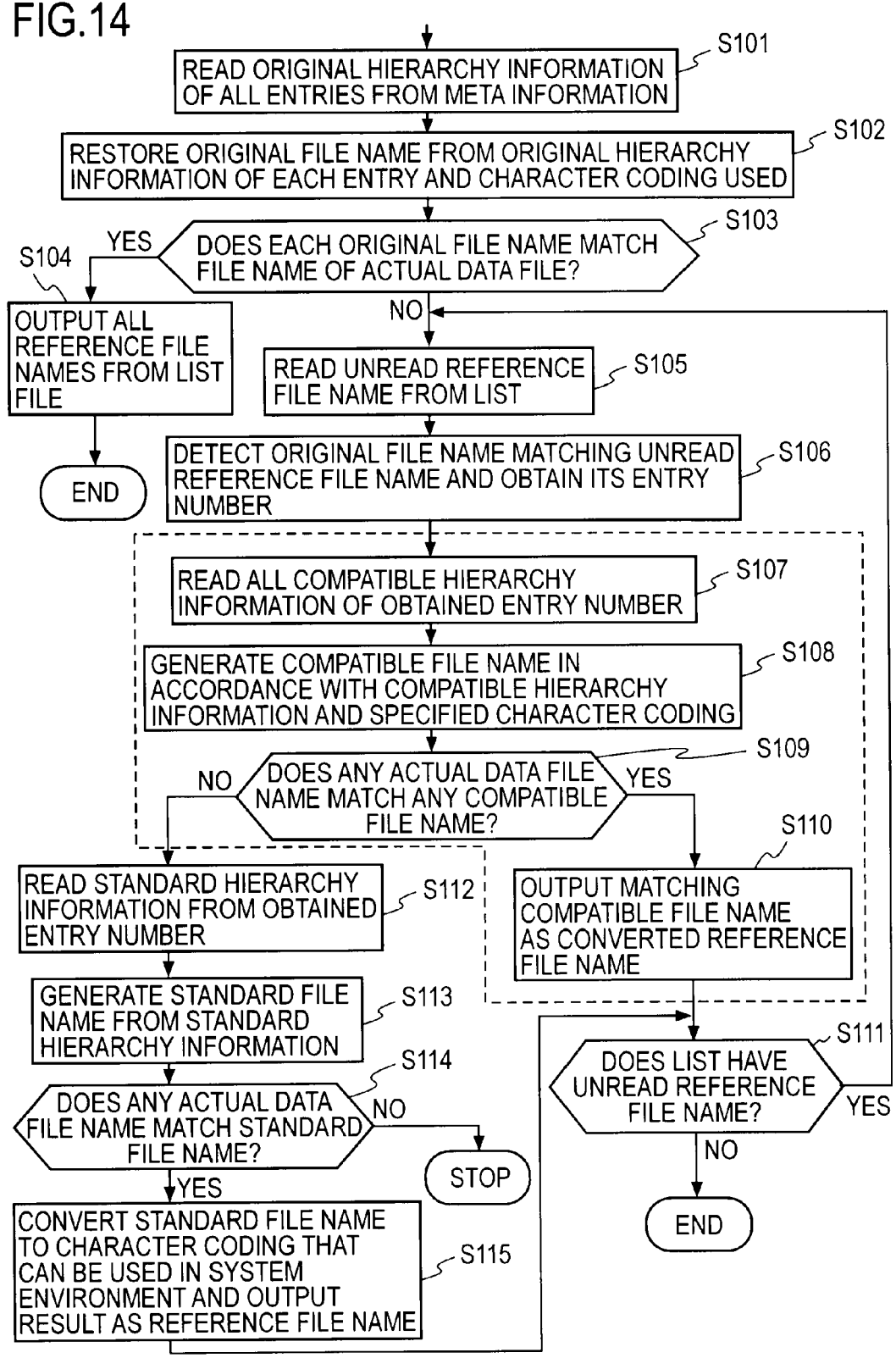
FIG. 14 is a flowchart showing processing in the file name converter shown in FIG. 13.

FIG. 13 shows a functional configuration of a file name converter 40 of the second embodiment, and its processing flowchart is shown in FIG. 14. The file name converter 40 includes a hierarchy information searching and reading block 41, an original file name restoration block 42, a comparison block 43, and a compatible and standard file name generation block 44. The hierarchy information searching and reading block 41 includes a hierarchy information storage block 41A, an actual data file name storage block 41B, and a reference file name storage block 41C. It is assumed here that the file set FS expanded by the decoder and the initial archive file ARC are stored on the same OS or file system, as shown in FIG. 13. For example, FIG. 12 shows that the file name converter 40 converts a reference file name listed in the play list file PLF of the expanded file set FS to the same file name as the file name (actual data file name) of the expanded actual data file in the expanded file set (decoded file set) FS in the target system environment, and gives the file name to the music player 31. The file name converter 40 may be incorporated in the music player 31 or may be incorporated in the decoder 20, as indicated by a dashed line in FIG. 8.

In FIG. 13, the hierarchy information searching and reading block 41 reads the original hierarchy information of all entries from the meta information field MET of the archive file ARC and stores the information in the hierarchy information storage block 41A (step S101). The original file name restoration block 42 restores the original file name in accordance with the stored original hierarchy information of each entry and the character coding used, in the same way as described in decoding, and stores the file name (step S102). The hierarchy information searching and reading block 41 reads the file names of actual data files DF1, DF2, and DF3 from the file set FS and stores them in the actual data file name storage block 41B. The comparison block 43 checks whether the restored original file names match the stored actual data file names (step S103). If the file names are the same, the hierarchy information searching and reading block 41 outputs all the reference file names read from the play list file PLF as they are (step S104), and the processing ends.

If one of the original data file names does not match any of the actual data file names in step S103, the hierarchy information searching and reading block 41 reads one unread reference file name from the play list PLF of the file set FS and stores it in the reference file name storage block 41C (step S105). The comparison block 43 detects an original file name that matches the unread reference file name and obtains its entry number (step S106). The hierarchy information searching and reading block 41 reads all the compatible hierarchy information from the entry having the obtained entry number (step S107). The compatible and standard file name generation block 44 generates compatible file names in accordance with the compatible hierarchy information and the specified character coding (step S108). The comparison block 43 checks whether any of the compatible file names matches a stored actual data file name (step S109). If a match is found, the compatible and standard file name generation block 44 outputs the compatible file name as a converted reference file name (step S110). The hierarchy information searching and reading block 41 checks whether the play list file PLF includes an unread reference file name (step S111). If yes, the processing returns to step S105, and the subsequent steps are repeated. If an unread reference file name is not found, the processing ends.

If it is found in step S109 that any of the compatible file names does not match a stored actual data file name, the hierarchy information searching and reading block 41 reads the standard hierarchy information from an entry having the obtained entry number (step S112). The compatible and standard file name generation block 44 generates a standard file name from the standard file hierarchy information, in the same way as described in decoding (step S113). The comparison block 43 checks whether the generated standard file name matches any actual data file name (step S114). If a match is found, the standard file name is converted to a character coding that can be used in the system environment, and the result is output as the reference file name (step S115).

In that case, the file names of all the actual data files are converted to the character coding that can be used in the system environment, and the results are stored. If a match is not found, the expanded file set FS is regarded as inappropriate, and the processing stops.

According to the file name converter and conversion method of the embodiment, even if the restored original file name does not match any actual data file name, there is still a possibility of finding an actual data file name matching the compatible file name restored from the corresponding compatible hierarchy information or the standard file name generated from the standard hierarchy information, by finding an original file name matching the reference file name listed in the list file. The possibility of failing to read the actual data file specified by the reference file name is reduced accordingly.

In the case described above, the archive file ARC is stored even after the archive file ARC is expanded. In the decoder, when the archive file ARC is expanded, the meta information MET (hierarchy information and attribute information) in the archive file may be written as an XML file, for example, in the expanded file set FS, as indicated by a dashed line in FIG. 13, and the file name converter 40 may use the hierarchy information. In that case, the archive file ARC may be erased after it is expanded. The processing shown in FIG. 14 may omit steps S107 to S110, which are enclosed by a dashed line, to jump from step S106 to step S112. If the original hierarchy information in the meta information MET is rewritten in accordance with the file names converted to the character coding that can be used in the system environment in step S115, when the file set FS is used next, the processing shown in FIG. 14 can go directly to step S104 from step S103.

Although the expanded actual data files are music data files in the embodiment shown in FIGS. 13 and 14, it is clear that the embodiment can be applied to any type of files, such as image data files or video data files.

In the second embodiment, an entry number including the original hierarchy information is determined from the original file name included in the original hierarchy information, and all the compatible hierarchy information or standard hierarchy information is read from an entry having the obtained entry number. Any method can be used so long as corresponding compatible hierarchy information or standard hierarchy information can be obtained by using the original file name as a key. The entry number need not be used. Instead, the original hierarchy information and the compatible hierarchy information or standard hierarchy information may be associated with each other in a link list.

In a state in which the archive file ARC is not expanded, the original file name included in the original hierarchy information can be found from the play list file PLF by using the listed reference file name, and the encoded file data (actual data) can be restored directly from the archive file. In that case, the target data can be decoded and reproduced directly without the intervention of the file name.

Third Embodiment

The archive file has the following advantages: The compressed file size is small; and a plurality of files put into a single package is easy to use. If the archive file can be input to an apparatus for an application directly, the package can be handled as is. In that case, each application must identify a data file that can be analyzed.

Figure 15:
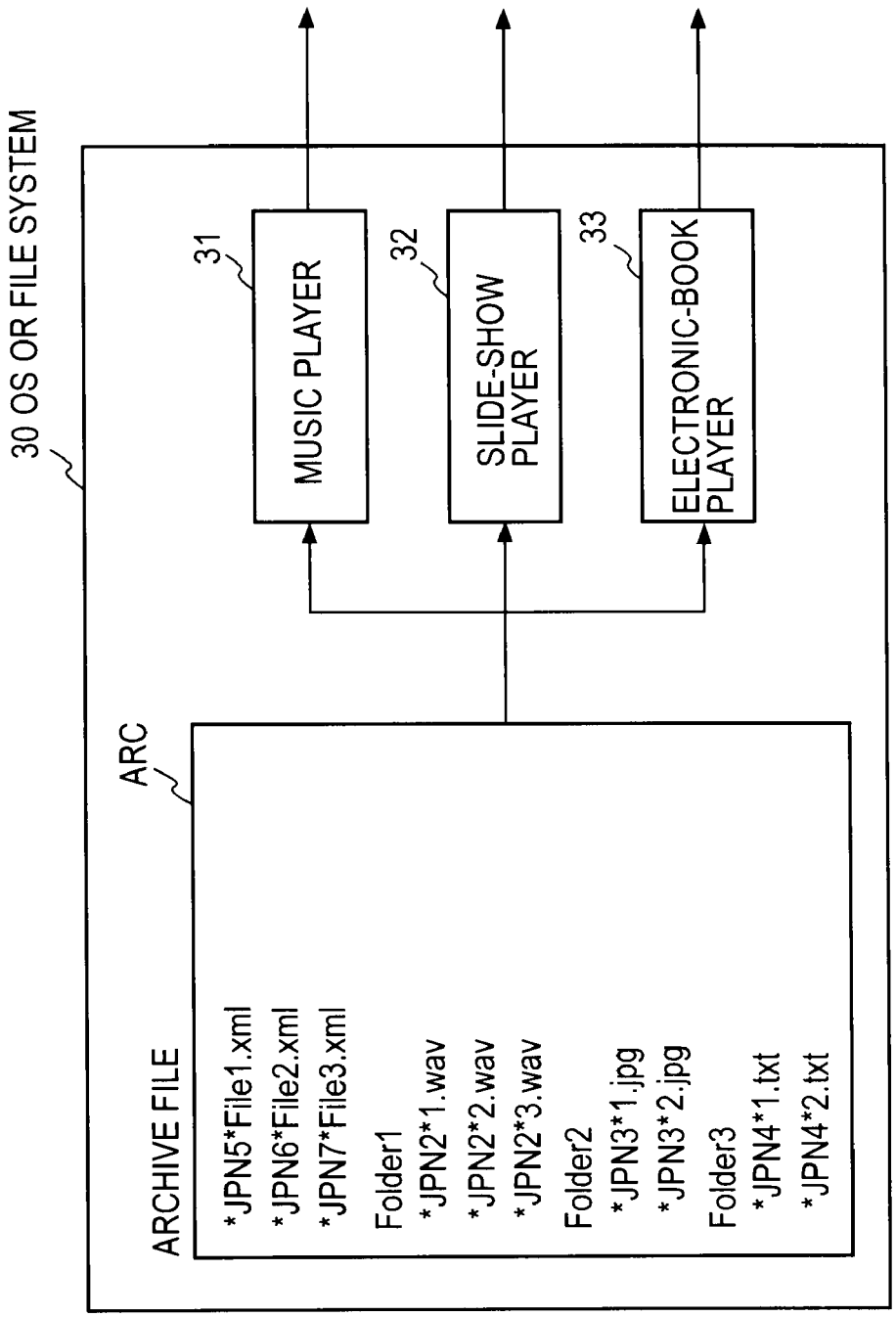
FIG. 15 is a view for illustrating playback by several types of players using a common archive file.

FIG. 15 shows an example in which a plurality of applications, such as a music player 31, a slide-show player 32, and an electronic-book player 33 here, use a single archive file ARC. The archive file ARC contains music data files (*JPN2*1.wav, *JPN2*2.wav, *JPN2*3.wav), photo data files (*JPN3*1.jpg, *JPN3*2.jpg), document data files (*JPN4*1.txt, *JPN4*2.txt) and other files, together with instruction information files for the players 31, 32, and 33, which are a music play list file (*JPN5*File1.xml), a slide-show list file (*JPN6*File2.xml), and an electronic-book meta information file (*JPN7*File3.xml) (hereinafter *JPN2*, *JPN3*, *JPN4*, *JPN5*, *JPN6*, and *JPN7* indicate Japanese kana and/or kanji character strings that mean "music", "photo", "document", "play list", "slide show", and "electronic-book meta information, respectively).

When the same archive file ARC is input, the players can play music, display an image slide show, and display an electronic book, depending on the function of each player. However, a conventional music player (player program on the PC), for example, is programmed to read just a play list file having a predetermined particular file name, such as "*JPN5*File". If the file name of the play list file used as a playback instruction information file in the archive file is changed from "*JPN5*File" to "**JPN8*File" (*JPN8* indicates a Japanese kana and/or kanji character string that means "music list"), for example, the conventional music player cannot obtain the play list file (playback instruction information file) from the archive file. The present embodiment provides a player and a playing method that can solve this type of problem and can handle the archive file in accordance with the function of the player even if the file name of the playback instruction information file is changed.

Figure 16:
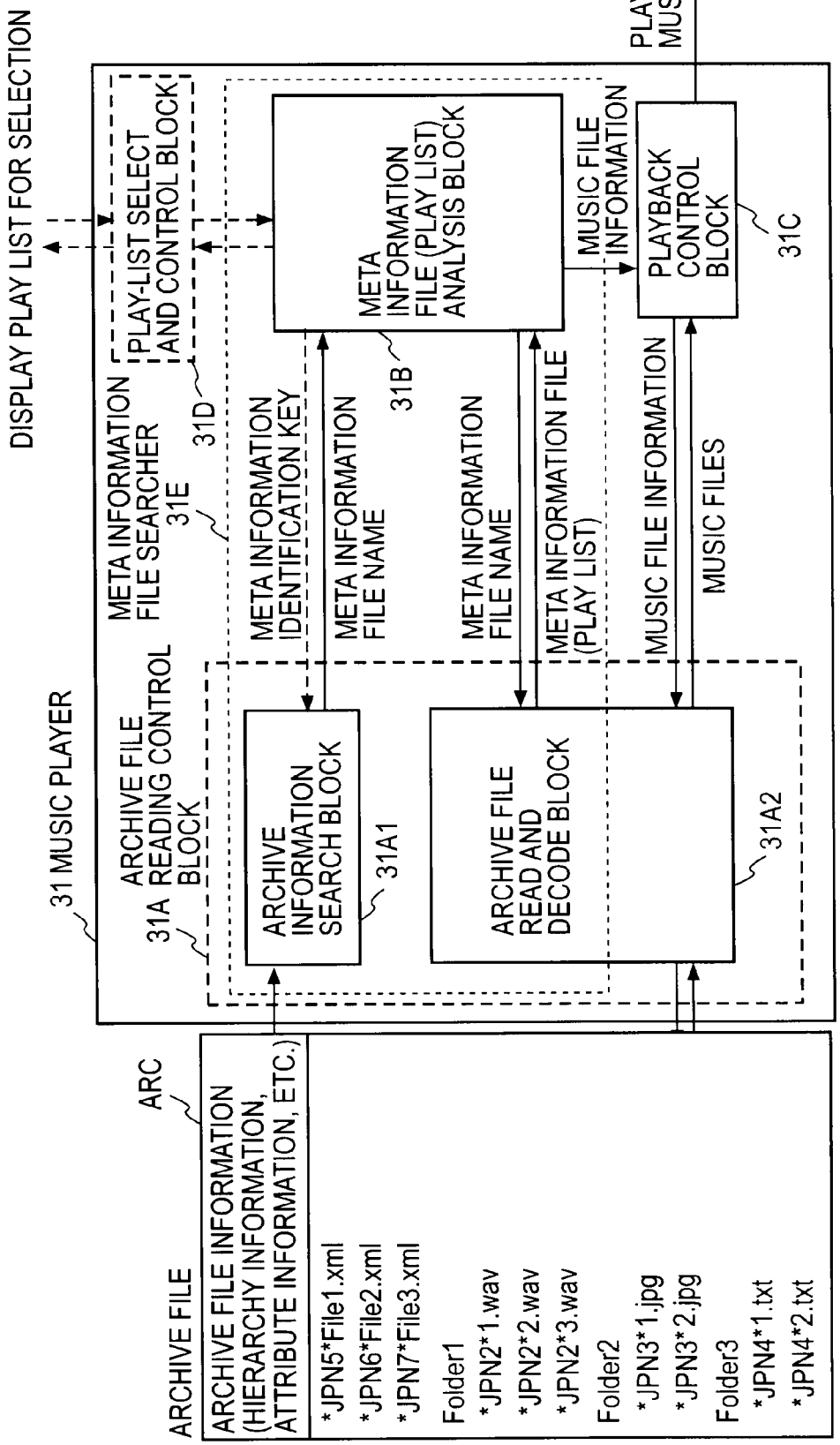
FIG. 16 is a functional block diagram of a music player.
Figure 17:
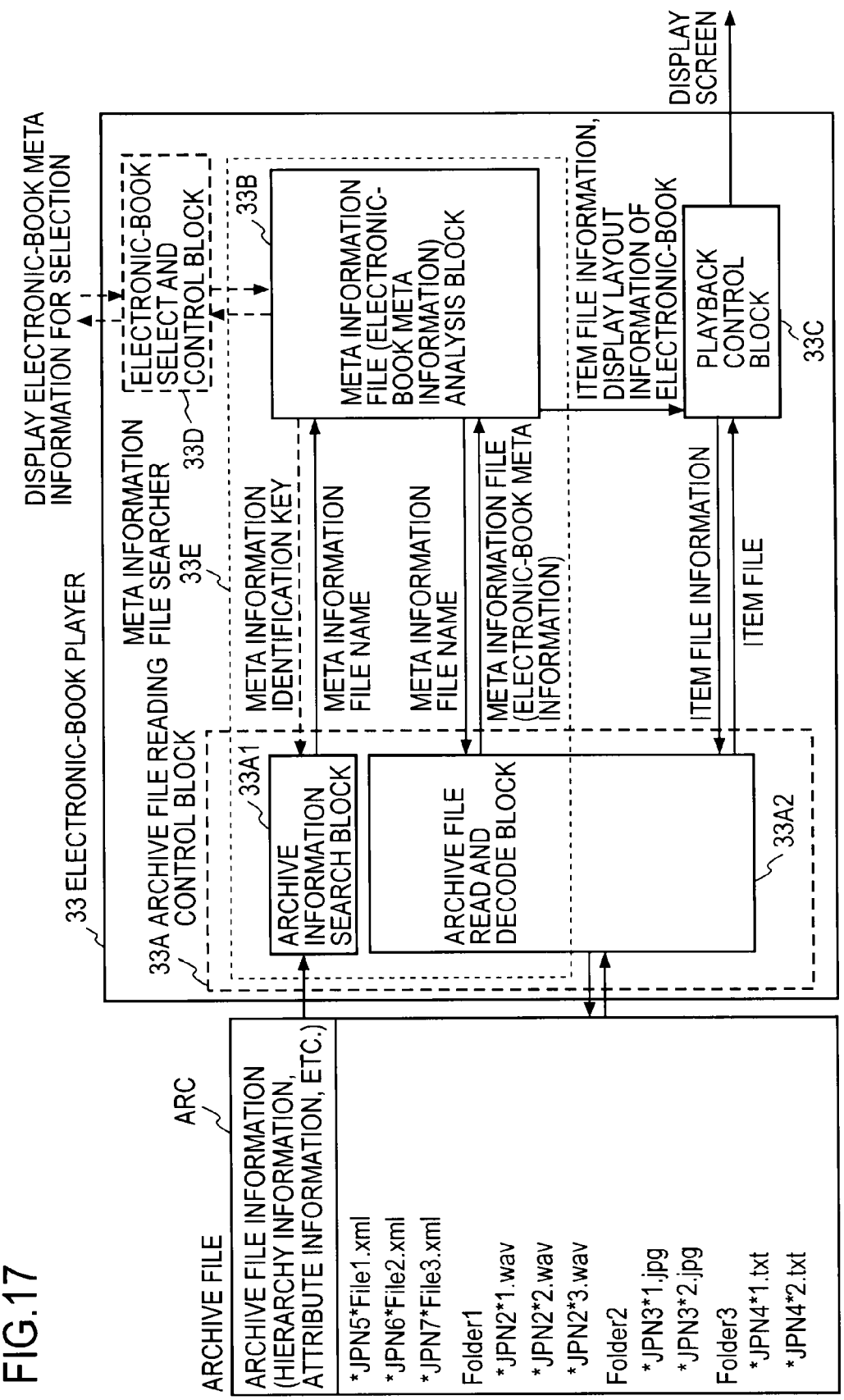
FIG. 17 is a functional block diagram of an electronic-book player.

FIG. 16 shows an example configuration of the music player 31 of the present embodiment, and FIG. 17 shows an example configuration of the electronic-book player 33 of the present embodiment. In the examples shown, the same archive file ARC is input to both the music player 31 and the electronic-book player 33. The archive file ARC includes archive information that includes hierarchy information and attribute information, playback instruction information files, and actual data files that includes playback data files. In the present embodiment, the archive information has characteristics that will be described with reference to FIG. 18.

Music Player

The music player 31 of the present embodiment includes an archive file reading control block 31A, a meta information file (play list) analysis block 31B, and a playback control block 31C. The archive file reading control block 31A includes an archive information search block 31A1 and an archive file read and decode block 31A2.

The archive file ARC is input to the music player 31. If the archive file ARC shown as an example in FIG. 16 is held on a hard disk or in a server on the Internet and if the music player 31 is an application program running on a personal computer (PC) (in this case, the player means a player program), the user can input the archive file ARC to the player by a dragging-and-dropping the archive file onto the GUI icon of the music player 31.

When the archive file ARC is input to the music player 31, the archive information is first read from the archive file and passed to the archive information search block 31A1. The archive information includes hierarchy information, such as the file names of files and folder names included in the archive file ARC, and attribute information, such as a read or write permission attribute of each file.

The archive information search block 31A1 uses key information (hereinafter called a meta information identification key) for identifying a meta information file that can be interpreted as input meta information by the player 31 (music player, in this embodiment) and finds meta information identified by the meta information identification key, from the input archive information. The meta information identification key may be provided in the archive information search block 31A1 beforehand or may be given by the meta information file (play list) analysis block 31B, as indicated by a dashed line.

For instance, the meta information identification key can be a file name identifying a music play list or additional information indicating that the file is a music play list (details of which will be described later). In the example shown in FIG. 16, "*JPN5*File1.xml" included in the archive file is a meta information file that can be used by the music player 31. The file "*JPN5*File1.xml" is identified from the archive information in accordance with the meta information identification key. The archive information search block 31A1 passes the information (file name) of the identified meta information file "*JPN5*File1.xml" to the meta information file (play list) analysis block 31B.

The meta information file (play list) analysis block 31B makes a file read request by giving the archive file read and decode block 31A2 the identified meta information file name input from the archive information search block 31A1. The archive file read and decode block 31A2 reads the meta information file "*JPN5*File1.xml" from the archive file ARC and gives the file to the meta information file (play list) analysis block 31B.

Then, the meta information file (play list) analysis block 31B analyzes the content of the meta information file "*JPN5*File1.xml" passed from the archive file read and decode block 31A2. The meta information file "*JPN5*File1.xml" holds music file information for identifying the files to be played back, for example. On the basis of the obtained music file information, the playback control block 31C allows the archive file read and decode block 31A2 to read and decode the encoded (compressed) music files "*JPN2*1.wav", "*JPN2*2.wav", and "*JPN2*3.wav" one after another, and can play back the files.

If the music player 31 has a play-list select and control block 31D, as indicated by a dashed line in FIG. 16, and if a plurality of meta information files (music play lists) are found by using the meta information identification key, the meta information file (play list) analysis block 31B may allow the play-list select and control block 31D to display the meta information file names on a display means, which is not shown in the figure, so that the user can make a choice.

Electronic-Book Player

FIG. 17 shows a functional configuration of the electronic-book player 33. The configuration is basically the same as that of the music player 31 shown in FIG. 14, but the information to be handled is different. The player includes an archive file reading control block 33A, a meta information file (electronic-book meta information) analysis block 33B, and a playback control block 33C. The archive file reading control block 33A includes an archive information search block 33A1 and an archive file read and decode block 33A2. The same archive file ARC as shown in FIG. 16 is input.

The basic operation of the electronic-book player 33 is the same as the basic operation of the music player 31 shown in FIG. 16. In the example shown in FIG. 17, "*JPN7*File3.xml" included in the archive file is a meta information file that can be used by the electronic-book player 33. A file "*JPN7*File3.xml" is identified from the archive information by using a meta information identification key. The archive information search block 33A1 passes the file name of the identified meta information file "*JPN7*File3.xml" to the meta information file (electronic-book meta information) analysis block 33B.

The meta information file (electronic-book meta information) analysis block 33B makes a file read request by giving the archive file read and decode block 33A2 the meta information file name input from the archive information search block 33A1. The archive file read and decode block 33A2 reads the meta information file "*JPN7*File3.xml" from the archive file ARC and passes it to the meta information file (electronic-book meta information) analysis block 33B.

The meta information file (electronic-book meta information) analysis block 33B analyzes the content of the meta information file "*JPN7*File3.xml" passed from the archive file read and decode block 33A2. The meta information file "*JPN7*File3.xml" holds item file information identifying a document file or an image file that serves as an item forming each page and information on the page layout, for example. On the basis of the obtained item file information, the playback control block 33C allows the archive file read and decode block 33A2 to read item files "*JPN4*1.txt", "*JPN4*2.txt", and "*JPN4*3.txt" and can play back (display) information in accordance with the layout information in those files.

The electronic-book player 33 shown in FIG. 17 may also include an electronic-book select and control block 33D, as indicated by a dashed line, as in FIG. 16, so that the user can make a choice from a plurality of pieces of electronic-book meta information.

A method by which the player shown in FIG. 16 identifies a meta information file and details of archive information included in the archive file will be described. The meta information file can be identified by a special file name specified beforehand or by using a special character string as a file name extension. The length of the character string that can be used as a file name and the character coding depend on the OS or file system. Accordingly, in this embodiment, "file type information" is held in the archive information.

FIG. 18 shows an example of archive file information included in the archive file ARC shown in FIG. 16. The entry corresponding to each actual data file contains the original hierarchy information of the file name, the character coding used there, and the standard hierarchy information, as in FIG. 2.

In FIG. 18, however, a special feature is provided in that file type information is added to each entry, as a meta information identification key. For example, entry 1 corresponding to a meta information file "*JPN5*File1.xml" for audio playback in the archive file ARC contains a character string "Playlist" as the file type information. Entry 2 corresponding to a meta information file "*JPN6*File2.xml" for slide show playback contains a character string "SlideShowList" as the file type information. Entry 3 corresponding to a meta information file "*JPN7*File3.xml" for electronic book playback contains a character string "E-BookMetaInfo" as the file type information. These character strings are defined to indicate the types of the meta information files that can be used by the music player, slide-show player, and electronic-book player, and are used as meta information identification keys.

The archive file information included in the archive file and the character string "PlayList" serving as the meta information identification key are input to the archive information search block 31A1. The archive information search block 31A1 searches through all the entries specified in the archive file information for an entry having the same character string ("PlayList" here) specified in the file type information field as the input meta information identification key.

If an entry having the same character string is found, the archive information search block 31A1 outputs the meta information file name obtained from the original hierarchy information or standard hierarchy information (determined by the character coding that can be used on the OS or file system, as described for the decoder) specified in the entry, as information identifying the meta information file. For example, a file name or file storage location information is used as information identifying the meta information file. In the example shown in FIG. 16, the meta information file name "*JPN5*File1.xml" is given to the meta information file (play list) analysis block 31B. Any other information that allows the archive file read and decode block 31A2 to identify and read the file can be used.

The meta information file (play list) analysis block 31B issues a read request to the archive file read and decode block 31A2 in accordance with the meta information file name passed from the archive information search block 31A1 and obtains the read meta information file, here "*JPN5*File1.xml". As shown in FIG. 16, the archive information search block 31A1, the file read function of the archive file read and decode block 31A2, and the meta information file (play list) analysis block 31B form a meta information file searcher 31E.

The same applies to the electronic-book player 33 shown in FIG. 17. The meta information file "*JPN7*File3.xml" is obtained by using "E-BookMetaInfo" as the meta information identification key.

Through the processing described above, a multi-purpose archive file containing meta information files of different types in the archive information can be created and can be used for different purposes as appropriate. As shown in FIG. 17, the archive information search block 33A1, the file read function of the archive file read and decode block 33A2, and the meta information file (electronic-book meta information) analysis block 33B form a meta information file searcher 33E.

A character string specified in the IANA character set can be used as a character string represented in the character coding, and mime Type and the like can be used as a meta information identification key.

Figure 19:
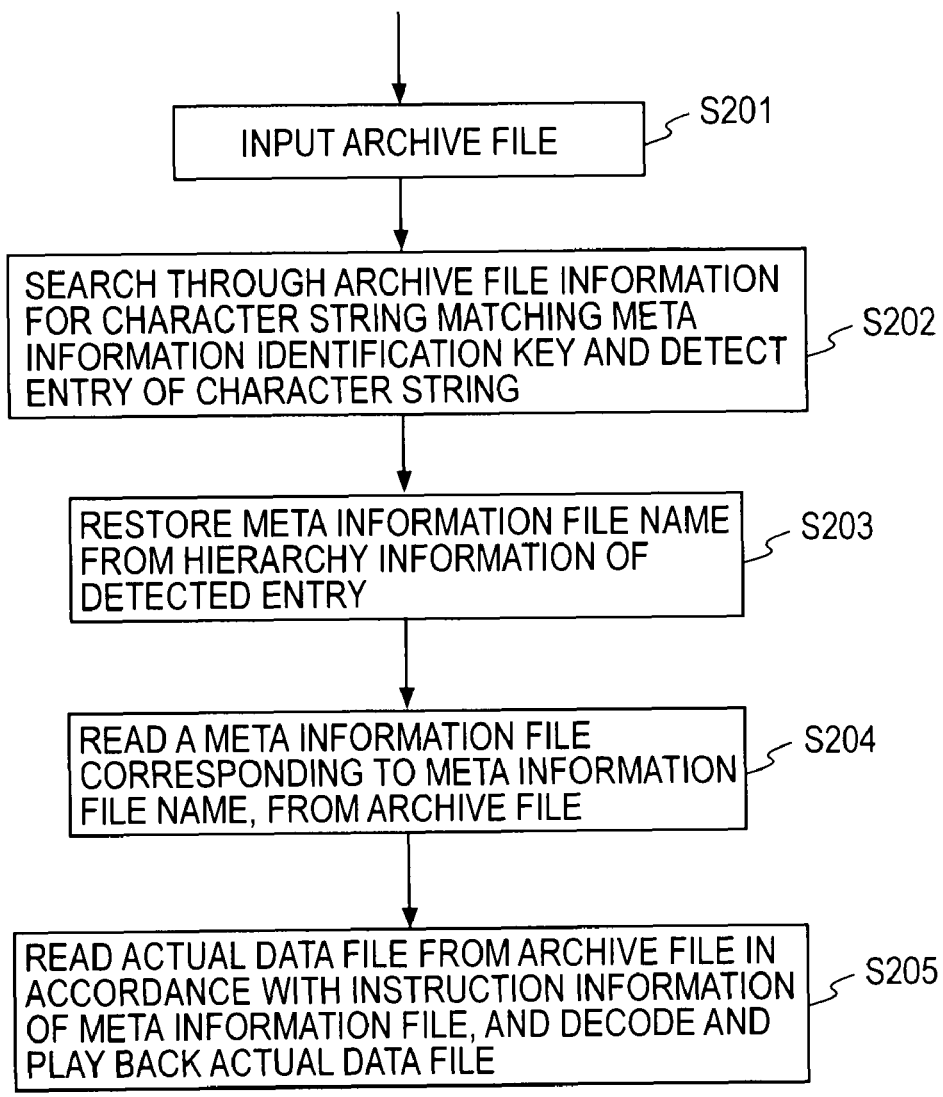
FIG. 19 is a flowchart showing processing in the players.

FIG. 19 is a flowchart showing an outline of playback processing in the players shown in FIGS. 16 and 17. When an archive file is input to the player (step S201), the player searches through the archive information for a character string matching the meta information identification key and detects an entry having the character string (step S202). A meta information file name is restored from the hierarchy information of the detected entry (step S203), and a meta information file corresponding to the meta information file name is read from the archive file (step S204). In accordance with the instruction information recorded in the meta information file, an actual data file is read from the archive file, decoded, and played back (step S205).

With the player and playing method of the embodiment, meta information identifying the type of each file can be recorded beforehand in association with the file, in the archive file information, and the original hierarchy information or compatible hierarchy information of the file can be obtained by searching for meta information having the same character string as the meta information identification key during playback. A meta information file name can be restored from the original hierarchy information or compatible hierarchy information, and the corresponding meta information file can be read from the archive file. Accordingly, the meta information file can be found even if a given name is used as the meta information file name.

What is claimed is:

1. A decoding method for restoring an initial file, file name, and file hierarchy from an archive file containing one or more files, one or more files contained in a folder, or one or more files and one or more files contained in a folder together with the file name and file hierarchy information, wherein standard hierarchy information which indicates a file name with a file path represented in a predetermined common character coding, irrespective of system environments, is at least included in the file hierarchy information in the archive file, and original hierarchy information which indicates an original character coding used to represent the file name with the file path is stored in association with the standard hierarchy information, when the file hierarchy information in the archive file contains the original hierarchy information, the decoding method comprising:

an original hierarchy information decoding step of restoring, when the file hierarchy information in the archive file contains the original hierarchy information and the original character coding is a non-ASCII special character coding that can be used in a system environment where decoding is performed, the original hierarchy information to a character string in the non-ASCII special character coding and of restoring the file name and file hierarchy; and a standard hierarchy information decoding step of restoring, when the file hierarchy information in the archive file does not include the character string in the non-ASCII special character coding or if the non-ASCII special character coding is not a character coding that can be used in the system environment where decoding is performed, the file name and file hierarchy by converting the file name in a standard character coding indicated by standard hierarchy information represented in the predetermined common character coding, irrespective of system environments, in the archive file into a file name in the character coding that can be used in the system environment.

2. The decoding method according to claim 1, wherein the original hierarchy information is a uniquely expressible character string in ASCII coding converted from a character string in the non-ASCII special character coding.

3. The decoding method according to claim 1, further comprising:

a compatible hierarchy information decoding step of restoring the file name and file hierarchy from compatible hierarchy information and a compatible character coding, when the non-ASCII special character coding recorded in association with the original hierarchy information in the file hierarchy information in the archive file is not a character coding that can be used in the system environment in which decoding is performed and when the compatible character coding specified in the compatible hierarchy information in the archive file can be used in the system environment.

4. The decoding method according to claim 1, further comprising:

an attribute information selecting and decoding step of using original attribute information for each file in the archive file when the original attribute information can be used in the system environment, or otherwise uses corresponding attribute information when the corresponding attribute information is included in standard attribute information.

5. The decoding method according to claim 4, wherein the attribute information selecting and decoding step includes a step of converting the original attribute information to compatible attribute information when the original attribute information cannot be used in the system environment and if the compatible attribute information can be used in the system environment.

6. A decoding method for restoring an initial file, file name, and file hierarchy from an archive file containing one or more files, one or more files contained in a folder, or one or more files and one or more files contained in a folder together with the file name and file hierarchy information, wherein standard hierarchy information which indicates a file name with a file path represented in a predetermined common character coding, irrespective of system environments, is at least included in the file hierarchy information in the archive file, the decoding method comprising:

a standard hierarchy information decoding step of restoring, when the file hierarchy information in the archive file does not include an original hierarchy information which contains a character string in a non-ASCII special character coding or when the non-ASCII special character coding in the original hierarchy information is not a character coding that can be used in the system environment where decoding is performed, the file name and file hierarchy by converting the file name in a standard character coding indicated by standard hierarchy information represented in the predetermined common character coding, irrespective of system environments, in the archive file into a file name in the character coding that can be used in the system environment.

7. A decoding method for restoring an initial file, file name, file hierarchy, and file attribute information from an archive file containing one or more files, one or more files contained in a folder or folders, or one or more files and one or more files contained in a folder or folders together with the file name, file hierarchy information, and file attribute information, wherein standard hierarchy information represented in a predetermined common character coding, irrespective of system environments, is at least included in the file hierarchy information in the archive file, standard attribute information is at least included in the file attribute information in the archive file, where file attributes corresponding to those in the standard attribute information exist in predetermined system environments, and original hierarchy information is stored in association with the standard hierarchy information, when the file hierarchy information in the archive file contains the original hierarchy information, the decoding method comprising:

an original hierarchy information decoding step of restoring, when the file hierarchy information in the archive file contains the original hierarchy information and a special character coding expressing the type of a character coding recorded in association with the original hierarchy information is a character coding that can be used in a system environment where decoding is performed, the original hierarchy information to a character string in the special character coding and of restoring the file name and file hierarchy;

a standard hierarchy information decoding step of restoring, when the file hierarchy information in the archive file does not include the character string in the special character coding or if the special character coding is not a character coding that can be used in the system environment where decoding is performed, the file name and file hierarchy by converting a file name in a standard character coding indicated by standard hierarchy information represented in a predetermined common character coding, irrespective of system environments, in the archive file into a file name in the character coding that can be used in the system environment; and an original attribute information decoding step of, when the file attribute information in the archive file includes the original attribute information suitable for the system environment where decoding is performed, selecting the outputting the original attribute information, or when the file attribute information in the archive file does not include the original attribute information suitable for the system environment where decoding is performed, converting the standard attribute information into file attribution information suitable for the system environment where decoding is performed and outputting the converted file attribution information.

8. A decoding method for restoring an initial file, file name, file hierarchy, and file attribute information from an archive file containing one or more files, one or more files contained in a folder or folders, or one or more files and one or more files contained in a folder or folders together with the file name, and file hierarchy information, wherein standard hierarchy information represented in a predetermined common character coding, irrespective of system environments, is at least included in the file hierarchy information in the archive file, original hierarchy information is stored in association with the standard hierarchy information, when the file hierarchy information in the archive file contains the original hierarchy information, a character string or symbol string represented in a special character coding and information indicating a type of the special character coding, the decoding method comprising:

an original hierarchy information decoding step of restoring, when the file hierarchy information in the archive file contains the original hierarchy information and a special character coding expressing the type of a character coding recorded in association with the original hierarchy information is a character coding that can be used in a system environment where decoding is performed, the original hierarchy information to a character string in the special character coding and of restoring the file name and file hierarchy; and a standard hierarchy information decoding step of restoring, when the file hierarchy information in the archive file does not include the character string in the special character coding or if the special character coding is not a character coding that can be used in the system environment where decoding is performed, the file name and file hierarchy by converting a file name in a standard character coding indicated by standard hierarchy information represented in a predetermined common character coding, irrespective of system environments, in the archive file into a file name in the character coding that can be used in the system environment.

* * * * *